US012769061B2

(12) United States Patent
Mesaritakis et al.

(10) Patent No.: US 12,769,061 B2
(45) Date of Patent: Oct. 20, 2026

(54) PHOTONIC INTEGRATED SIGNAL PROCESSING DEVICE

(71) Applicants: UNIVERSITEIT GENT, Ghent (BE); UNIVERSITY OF THE AEGEAN, Mytilene Lesvos (GR); IMEC VZW, Leuven (BE)

(72) Inventors: Charis Mesaritakis, Alimos (GR); Antonios Bogris, Kessariani (GR); Peter Bienstman, Ghent (BE); Chonghuai Ma, Ghent (BE); Muhammed Gouda, Ghent (BE)

(73) Assignees: UNIVERSITY OF THE AEGEAN, Mytilene Lesvos (GR); UNIVERSITEIT GENT, Ghent (BE); IMEC VZW, Leuven (BE)

( * ) Notice: Subject to any disclaimer, the term of this patent is extended or adjusted under 35 U.S.C. 154(b) by 344 days.

(21) Appl. No.: 18/579,646

(22) PCT Filed: Jul. 14, 2022

(86) PCT No.: PCT/EP2022/069821
§ 371 (c)(1),
(2) Date: Jan. 16, 2024

(87) PCT Pub. No.: WO2023/285636
PCT Pub. Date: Jan. 19, 2023

(65) Prior Publication Data

US 2024/0345326 A1 Oct. 17, 2024

(30) Foreign Application Priority Data

Jul. 15, 2021 (GR) .............................. 20210100477
Sep. 10, 2021 (EP) .................................... 21195873

(51) Int. Cl.
*G02B 6/28* (2006.01)
*G02B 6/12* (2006.01)
*H04B 10/2575* (2013.01)

(52) U.S. Cl.
CPC ....... *G02B 6/2861* (2013.01); *G02B 6/12004* (2013.01); *H04B 10/2575* (2013.01)

(58) Field of Classification Search
CPC .................................................... G02B 6/2861
See application file for complete search history.

(56) References Cited

U.S. PATENT DOCUMENTS 9,952,099 B2 4/2018 Wijbrans et al.
10,488,588 B1 11/2019 Seyedi
2019/0285815 A1* 9/2019 Sugiyama .............. G02B 6/125

FOREIGN PATENT DOCUMENTS

JP 2015184593 A 10/2015
WO 2011108617 A1 9/2011
(Continued)

OTHER PUBLICATIONS

Da Ros, Francesco et al., "Reservoir-computing based equalization with optical pre-processing for short-reach optical transmission", IEEE Journal of Selected Topics in Quantum Electronics, Feb. 28, 2020, 12 pages, vol. 26, No. 5.
(Continued)

*Primary Examiner* — Lisa M Caputo
(74) *Attorney, Agent, or Firm* — Workman Nydegger

(57) ABSTRACT

A photonic integrated circuit is provided for performing optical transient computing on an RF-modulated optical carrier signal. The photonic circuit includes at least two optical signal processing units, each including a filter device and a delay element for providing a delayed feedback signal to the filter device. The group delay induced by the delay element is in the range from 1 ps to 100 ps and the 3 dB bandwidth of the filter band is less than the inverse of the
(Continued)

group delay. The delay element is adapted to spectrally align at least a portion of the filter band with a resonance in the feedback signal and center frequencies of filter bands are offset between 1 GHz and 100 GHz to allow filtering of different portions of the modulated carrier signal spectrum. The signal processing device has a trainable readout circuit.

20 Claims, 9 Drawing Sheets

(56) References Cited

FOREIGN PATENT DOCUMENTS

| | | | |
|---|---|---|---|
| WO | 2018219839 | A1 | 12/2018 |
| WO | 2020089661 | A1 | 5/2020 |

OTHER PUBLICATIONS

Mesaritakis, Charis et al., "High-speed all-optical pattern recognition of dispersive Fourier images through a photonic reservoir computing subsystem," Optics Letters, Jul. 15, 2015, pp. 3416-3419, vol. 40, No. 14.

Mesaritakis, Charis et al., "Spatial Photonic Reservoir Computing based on Non-Linear Phase-to-Amplitude Conversion in Micro-Ring Resonators", 2021 Optical Fiber Communications Conference and Exhibition, Jul. 26, 2021, 3 pages.

Sohn, Donggyu et al., "Time-reversal symmetry breaking with acoustic pumping of nanophotonic circuits", Nature Photon, as early as Feb. 1, 2018, pp. 91-97, vol. 12.

Sounas, Dimitrios et al., "Non-reciprocal photonics based on time modulation", Nature Photonics, Nov. 30, 2017, pp. 774-783, vol. 11.

Tait, Alexander et al., "Neuromorphic photonic networks using silicon photonic weight banks", Scientific Reports, Aug. 7, 2017, pp. 1-10, vol. 7, No. 1.

Xie, Yiwei et al., "Selectable-FSR 10-GHz Granularity WDM Superchannel Filter in a Reconfigurable Photonic Integrated Circuit", Journal of Lightwave Technology, IEEE, USA, May 11, 2018, pp. 2619-2626, vol. 36, No. 13.

Extended European Search Report from Corresponding European Patent Application No. EP21195873.1, Mar. 11, 2022.

International Search Report from Corresponding PCT Application No. PCT/EP2022/069821, Nov. 7, 2022.

* cited by examiner

FIG. 17(a)
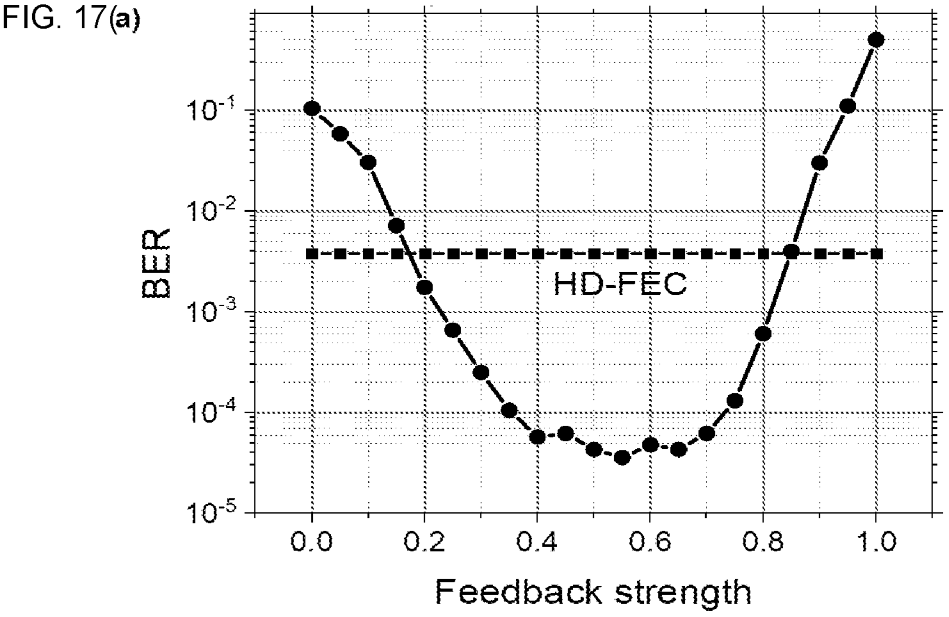
FIG. 17(b)
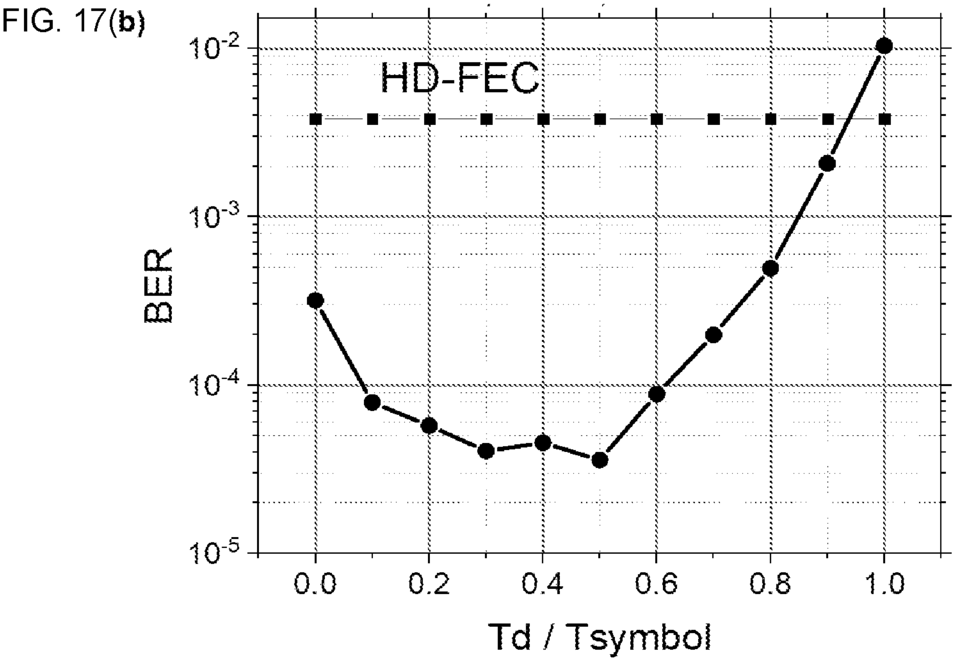
FIG. 17

FIG. 18(a)
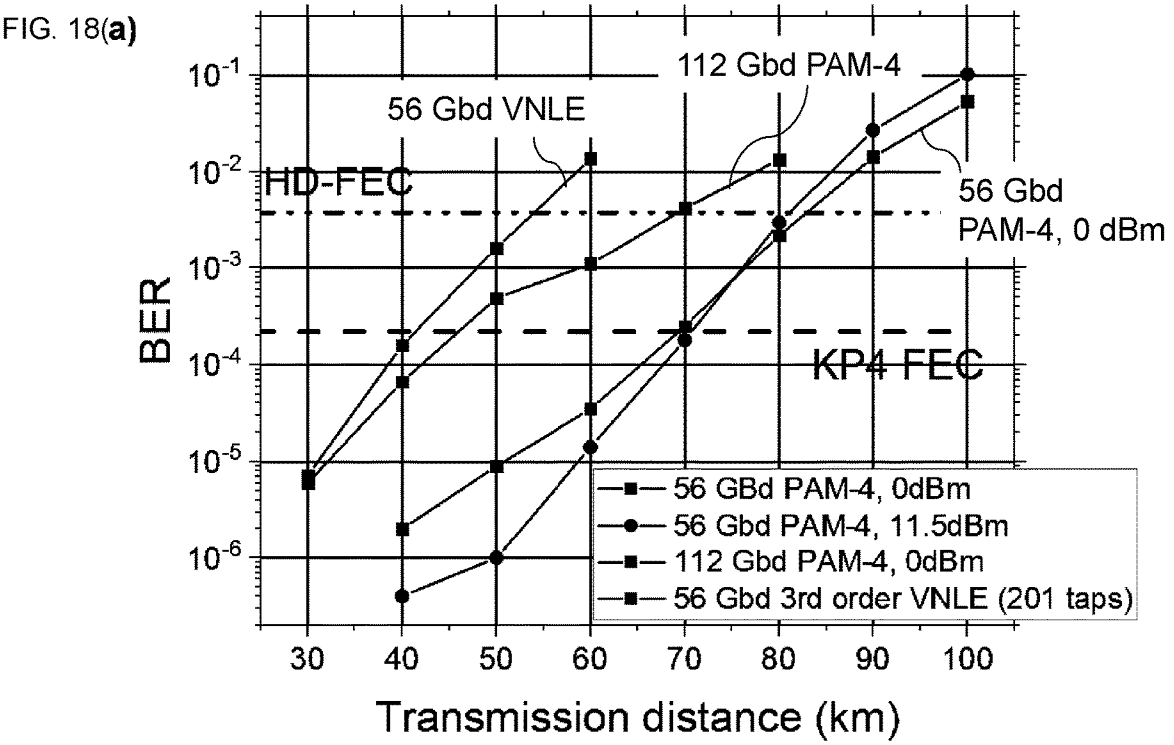
FIG. 18(b)
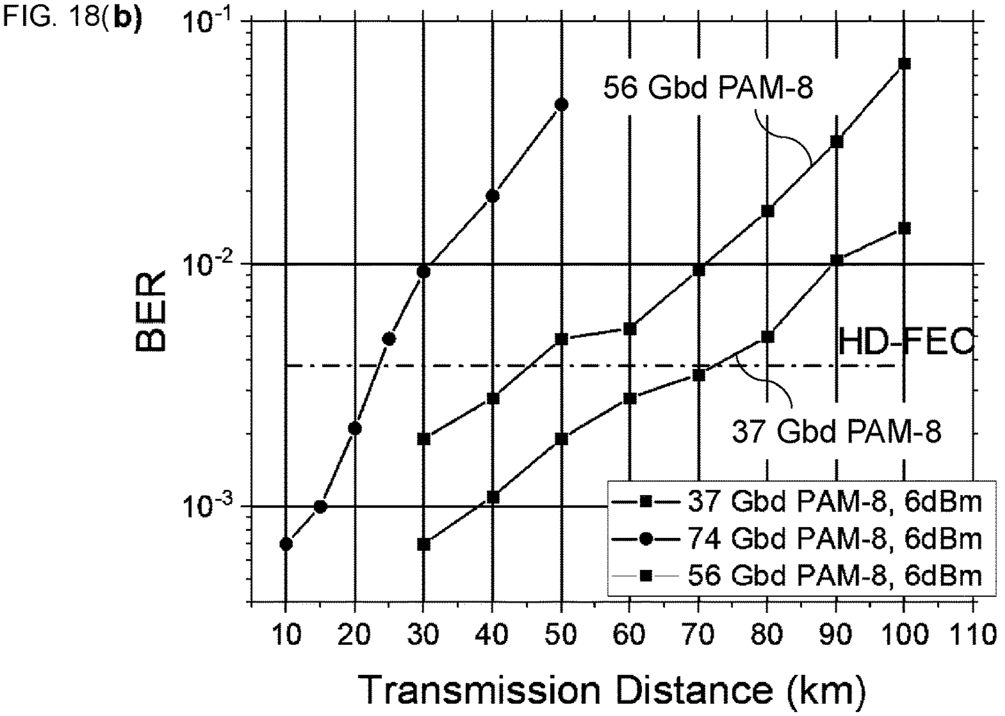
FIG. 18

PHOTONIC INTEGRATED SIGNAL PROCESSING DEVICE

FIELD OF THE INVENTION

The present invention relates to the field of optical signal and information processing devices and related methods in general, and in particular relates to photonic integrated processing units for machine learning applications, optical signal processing devices comprising the photonic integrated processing units, and their use for time-series and symbol sequence processing, such as dispersion compensation and bit error correction in optical fiber-based communication networks that employ digitally modulated carrier signals, wideband spectroscopic signals, chaotic carriers and broadband sensory data.

BACKGROUND OF THE INVENTION

Optical processing or preprocessing devices are gaining momentum in the field of optical communication systems in view of the much elevated computation bandwidths they afford as compared to more conventional digital signal processors. Moreover, they are a more natural choice for fiber-based data links which already carry the transmitted symbols in the optical domain so that it makes sense to shift more processing tasks, such as channel equalization, towards the optical domain, benefiting from the higher bandwidth capacity.

Optical processing devices with enhanced functionality, such as a trainable readout layer, are of particular interest for high-speed fiber links and complex multi-leveled modulation schemes for which link distances are strongly affected by dispersion. More recently, machine-learning techniques have been applied to combined systems of front-ended photonic integrated circuits and back-ended electrical receiver circuits with the aim to provide more reliable and energy-efficient channel equalization. For instance, Mesaritakis, Charis, et al. "*Spatial Photonic Reservoir Computing based on Non-Linear Phase-to-Amplitude Conversion in Micro-Ring Resonators.*" *arXiv preprint arXiv:* 2101.04487 (2021), describe a spatial photonic reservoir computing architecture that is used to classify multi-Gbaud time traces subject to transmission effects in real-time. The computing architecture uses micro-ring resonator (MRR) assisted non-linear phase-to-amplitude conversion. However, this architecture is confined to serial processing of the optical input signal by a set of identical MRRs. Moreover, the weighted waveguide connections between successive MRRs, in addition to the cumulative insertion losses of each further MRR, are quickly attenuating the applied optical input signal and limit the processing capabilities and memory of the device.

In F. Da Ros, S. M. Ranzini, H. Buelow, and D. Zibar, "*Reservoir-computing based equalization with optical preprocessing for short-reach optical transmission*", *IEEE J. Select. Topics Quantum Electron*., pp. 1-1, 2020 a reservoir computing technique in the digital electronic domain is described, which uses optically preprocessed input signals to achieve more reliable point-to-point transmission of information over fiber channels. However, their study is limited to on-off keying with direct detection and software-implemented reservoir computing techniques. The achievable link distances are still limited. It is therefore desirable to provide hardware-implemented optical processing devices for conditioning and preprocessing a wider range of digitally modulated optical input signals, and RF-modulated signals in general, and to further improve transmission reliability over larger distances with respect to optical receivers using the optical processing devices.

SUMMARY OF THE INVENTION

It is an object of embodiments of the present invention to provide photonic integrated optical processing devices for optical transient computing that allows processing of a wider range of broadband optical signals, for instance time-varying optical signals such as RF-modulated optical carrier signals. It is a further object of embodiments of the present invention to provide photonic integrated optical processing devices for optical transient computing that achieve superior conditioning of the optical input signals with respect to a trainable readout layer, resulting in predicted outputs of the readout layer that have lower prediction errors.

The above objective is accomplished by a method and device according to the present invention.

In a first aspect, the invention relates to photonic integrated circuit for performing optical transient computing on an RF-modulated optical carrier signal. The photonic integrated circuit comprises at least two parallelly operable optical signal processing units, each optical signal processing unit including an optical filter device and an optical delay element arranged externally to the filter device. The delay element is connected to an input port and an output port of the filter device and provides an externally delayed feedback signal to the filter device, i.e. the filter device is operated in a recurrent mode. An input section of the delay element is configured to coherently combine the modulated carrier signal with the externally delayed feedback signal to create a new filter input signal. The group delay induced by the delay element is comprised in the range from 1 ps to 100 ps and the 3 dB optical bandwidth of a filter band of the filter device is less than the inverse of the group delay. The delay element is adapted to spectrally align at least a portion of the filter band with a resonance in the feedback signal. Center frequencies of filter bands associated with different optical signal processing units are offset, or tunable to have an offset, between 1 GHz and 100 GHz relative to each other, thus allowing different portions of the modulated carrier signal spectrum to be filtered.

The photonic integrated circuit can be used as an optical preprocessor in an optical receiver module. Its architecture is independent of a particular modulation format, thus accommodating a wide range of RF-modulated optical carrier input signals. The optical processing units of the photonic integrated circuit can be designed or tuned so that RF-modulated optical carrier input signals of varying bandwidths can be accommodated and processed. The photonic integrated circuit achieves superior preprocessing performance, e.g. conditioning of the optical input signals with respect to a trainable readout layer, by combining spectral filtering with the filter device in each optical signal processing unit with delayed feedback. Spectral filtering allows to explore the frequency dimension of the applied optical input signal and also enables parallel optical processing of the input signals, whereas the delayed feedback allows to explore time-dependent dependencies in the optical input signals. Moreover, the delayed feedback provides processing memory in the optical domain, rather than in the electrical domain, where it is more complex and expensive to implement. The combined effect of spectral filtering and delayed feedback also has the advantage of resonantly enhancing filtered frequency components, which increases the detectable optical power on at least one subsequent photodetector.

The parallel implementation of the optical signal processing units also allows for low-latency optical processing of input signals and thus contributes to feasibility of online training in a signal processing device which uses the photonic integrated circuit.

The filter device and the delay element of each processing unit can form a linear optical resonator cavity, in which the input port and the output port of the filter device are a single bidirectional port of the filter device and in which the filter device is configured to operate in reflection mode. Alternatively, the filter device and the delay element of each processing unit can form an optical ring resonator cavity, in which the input port and the output port of the filter device are different unidirectional ports of the filter device and in which the filter device is configured to operate in transmission mode. In embodiments of the invention, the input coupling ratio and the output coupling ratio of signal light into and out of the optical cavity formed by the delay element and the thereto connected filter device may be in the range from 10% to 50%.

In some embodiments of the invention, in which the delay elements are provided as dispersion-free waveguides, the group delay can be equal to the phase delay. In same or other embodiments of the invention, the group delay of the delay element may dominate the group delay of the filter device such that the group delay of the delay element is substantially equal to the cavity roundtrip time. In other embodiments of the invention, the combined group delay of delay element and filter device may be in the range from 1 ps to 200 ps, e.g. from 1 ps to 150 ps, e.g. from 1 ps to 100 ps.

In accordance with embodiments of the invention, the delay element of at least one of the plurality of optical signal processing units may comprise at least one of the following: a further optical filter device, a variable optical attenuator, an optical gain element, a phase modulator.

In accordance with some embodiments of the invention, an additional optical preamplifier may be arranged at the input connector of the photonic integrated circuit. This has the benefit of allowing boosting an attenuated modulated optical input signal to higher optical power levels. As a result, the modulated optical input signal may be launched at reduced power levels into a fiber link for transmission, which reduces the impact of fiber nonlinearities. Moreover, the optical preamplifier allows to compensate for varying signal attenuation losses in a same or different optical fibers over which the optical input signal is transmitted and/or to compensate for varying insertion losses associated with the different photonic integrated circuits (e.g. due to fabrication variations).

In accordance with embodiments of the invention, each filter device may be a passband filter or a peaking comb filter. Alternatively, each filter device may be a stopband filter or a notching comb filter. The filter device of one of the at least two optical processing unit may be a passband filter, whereas the filter device of the other one of the at least two optical processing units may be a bandstop filter. Filter bands associated with different ones of the plurality of optical signal processing units may be partially overlapping in frequency space. The 3 dB optical bandwidth of each filter band may be comprised in the range from 5 GHz to 150 GHz.

In accordance with embodiments of the invention, the filter bands (i.e. passbands or stopbands) associated with the plurality of optical signal processing units are contiguous in frequency space, and/or points of cross-over between neighboring filter bands are regularly distributed in frequency space.

In accordance with embodiments of the invention, the 3 dB optical bandwidth of each filter band may substantially be equal to FSR/N, wherein N is the number of optical signal processing units of the photonic integrated circuit that receive the modulated optical input signal and FSR is the free spectral range associated with the resonator cavity formed by the delay element with connected filter device.

In accordance with embodiments of the invention, one or more filter device may be provided as a higher-order bandpass filter. As compared to first-order bandpass filters, a steeper roll-off than 20 dB/decade can be obtained. The resulting decrease in the filter transition band has the advantage that more bandpass filters can be used to densely slice the optical input signal spectrum without introducing additional overlap between adjacent filter passbands.

In a second aspect, the invention relates to a signal processing device which comprises a photonic integrated circuit according to the first aspect and a trainable readout circuit. The trainable readout circuit is configured to weight output signals from the plurality of signal processing units, or signals derived therefrom, and to combine the weighted signals into at least one readout signal. The signal processing device may be used as an optical receiver or may be part of such optical receiver.

In accordance with some embodiments of the invention, the readout circuit may comprise a plurality of photodetectors that are operatively coupled to respective outputs of the plurality of optical signal processing units to detect the outputs signals generated by the plurality of optical signal processing units. At least one electronic filter can be configured for weighting and summing a plurality of photodetector output signals. The at least one electronic filter may be a digital or analog finite impulse response filter (FIR) of filter order $M \geq 0$ and with a set of adjustable filter weights, or a digitally implemented artificial neural network having a set of adjustable layer interconnection weights. Embodiments that use weighting in the electrical domain, in particular the digital domain, can benefit from a greater design flexibility, more accurate weighting and less phase-sensitive processing of detected output signals.

The weighting in the electronic or optical domain is preferably reconfigurable, e.g. by changing a the amplitude or average power of the signals that controls the weights of the trainable readout circuit. This has the advantage that a same hardware solution, e.g. integrated photonic chip, can be adapted to run multiple applications, such as pattern recognition in telecom or imaging applications.

In accordance with embodiments of the invention, the filter order M of each finite impulse response filter may be $M \leq 50$. The signal processing device may further comprise a storage unit for storing a set of weights applicable to the output signals from the plurality of optical signal processing units, and/or may comprise at least one A/D converter.

In accordance with other embodiments of the invention, the readout circuit may further comprise at least one linear optical readout stage, operatively coupled to respective outputs of the plurality of optical signal processing units and configured for weighting and summing a plurality of output signals from the plurality of optical signal processing units, and at least one photodetector for detecting the summed and weighted output signals from the linear optical readout stage. The at least one linear optical readout stage may be a tapped or branched optical delay line filter of filter order $M \geq 0$ and having a set of adjustable filter weights. Embodiments that use weighting in the optical domain may have the additional advantage of decreasing design complexity, design space and cost, and energy consumption as compared to electrically implemented weighting. Moreover, the bandwidth limitations and need for high-speed electronic components are virtually absent in the optical domain, which lowers processing latency and increases throughput.

The readout circuit may further comprise a control unit for controlling a set of adjustable weights applicable to the output signals from the plurality of signal processing units, or the signals derived therefrom. The control unit is configured to generate error signals from the at least one readout signal and a target sequence, and to update the set of weights based on the error signals, wherein the at least one readout signal is obtained with respect to a training signal being the RF-modulated optical carrier signal, modulated with a training sequence associated with the target sequence.

The signal processing device, for instance the readout circuit thereof, may further comprise a decision circuit for determining a symbol value of a digitally modulated optical carrier signal based on the at least one readout signal, by comparing the readout signal to one or more threshold levels. The threshold levels can be programmable. Additionally, a sampling time of the A/D converters may be adjustable, for instance by using eye pattern information collected by the readout circuit, e.g. using the point of optimal eye opening as sampling time.

One or more photodetectors of the readout circuit, e.g. each photodetector, may be provided as part of the photonic integrated circuit, resulting in a compact and energy-efficient signal processing device, for instance a complete on-chip solution. A transimpedance amplifier module may be connected to one or more photodetectors, e.g. to each photodetector, to form at least a part of a photoreceiver module. The transimpedance amplifier module contains at least one voltage amplifier stage which is configured for operating predominantly in a nonlinear region. This transimpedance amplifier module is adapted to controlled the extent of the nonlinearity region of the contains at least one voltage amplifier stage.

The present invention also relates to a method for processing band-limited optical input signals by performing optical transient computing in a photonic integrated circuit of the first aspect. The method comprises applying a band-limited optical input signal, such as a digitally modulated optical telecommunication signal, to a photonic integrated circuit according to the first aspect, wherein the 3 dB optical bandwidth of the optical input signal is smaller than the inverse of a roundtrip time of the feedback signal through the delay element and filter device in each one of the at least two optical signal processing units. The method also comprises providing a set of pretrained weights, and weighting output signal of the plurality of optical signal processing units, or signals derived therefrom, with the pretrained weights in the optical or the electrical domain. Signals derived from the output signal of the plurality of optical signal processing units include photodetector signals obtained in response to the output signal of the plurality of optical signal processing units and/or digital representations of the output signal of the plurality of optical signal processing units (i.e. digitized versions thereof). The weighted output signals are then combined into at least one readout signal.

Optionally, a local oscillator signal of substantially equal frequency as an optical carrier frequency or center frequency of the band-limited optical input signal is provided and frequency-mixing the local oscillator signal with output signal of the plurality of optical signal processing units, or signals derived therefrom, is performed on at least one photodetector. Coherent detection schemes have the advantage of allowing better compensation of chromatic dispersion effects on the transmitted RF-modulated optical carrier signal in a digital hardware solution. Moreover, strong and noise-free mixing gain is obtained, even without optical pre-amplification of the input signal, which overcomes thermal noise limitations at the detection stage.

The method can be used to condition band-limited optical input signals that are affected by distortions during transmission over an optical communication channel, e.g. a fiber optical channel. Distortions may include chromatic dispersion or attenuation distortion. A more specific use of the method is to reduce intersymbol interference in sequences of data symbols that are transmitted over a fiber optical communication channel or to achieve equalization of a fiber optical communication channel for the transmission of sequences of data symbols, wherein the sequences of data symbols are transmitted as a digitally modulated optical carrier signal. A symbol duration of this digitally modulated optical carrier signal is selected larger than a roundtrip time of the feedback signal through the delay element and filter device in each one of the at least two optical signal processing units. This leads to self-interference effects and interference effects between successive symbols, which is beneficial for intersymbol interference reduction. A symbol duration of this digitally modulated optical carrier signal is larger than the roundtrip time of the feedback signal if, for instance, the first lobe of the digitally modulated optical carrier signal is under (e.g. less than) the inverse of the roundtrip time.

It is an advantage of embodiments of the invention that the signal processing device can be used as, or integrated into, an optical receiver module with increased receiver-sided channel equalization performance at reduced complexity and energy consumption.

It is an advantage of embodiments of the invention that the signal processing device can be used to reduce dispersion distortion of double-side band modulated optical carrier input signals transmitted over a fiber optical communication channel, which is more severe as compared to dispersion distortion of single-side band modulated optical carrier input signals transmitted over the same channel.

It is an advantage of embodiments of the invention that linear optical or linear electronic filters (analog or digital) can be used in the readout circuit of the signal processing device, which do not require the generation of higher-order nonlinear terms, as for instance in Volterra-type nonlinear filters, and thus are easier to implement and to train.

It is an advantage of embodiments of the invention that the signal processing device can be used in (chromatic) dispersion-unmanaged optical fiber communication links to increase the link distance to mid-reach or long-reach, e.g. to 40 km or more, e.g. 60 km or more, e.g. up to 80 km, without significantly deteriorating the bit error rate for digitally modulated signals transmitted over the fiber channel at elevated modulation rates, e.g. at 28 Gbaud or higher, e.g. at 56 Gbaud or higher.

It is an advantage of embodiments of the invention that the signal processing device can be used to mitigate intersymbol interference degradation in transceiver systems in which the system bandwidth has been restricted intentionally, e.g. by optical filtering with a narrowband optical filter, without strongly advancing the electronics of the transmitter and/or receiver transceivers through the implementation of pre- or post-equalization techniques. A more restricted system bandwidth may be beneficial for achieving dense multiplexing of different frequency channels or for using A/D converters with reduced power consumption or speed, or larger effective resolution.

It is an advantage of embodiments of the invention that the photonic integrated circuit and readout circuit allow polarization diversity and/or phase diversity.

It is an advantage of embodiments of the invention that the signal processing device enables an energy-efficient hardware implementation with a high optical system bandwidth and a lower overall processing latency, thus enabling online training and adaptation.

It is an advantage of embodiments of the invention that the photonic integrated circuit can be adapted to allow coupling to a variety of optical fibers.

It is an advantage of embodiments of the invention that the conventional decoder units can be used in the signal processing device, whereby reuse of well-performing decoder architectures is possible.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, in which:

FIG. 17, including FIGS. 17*a* and 17*b*, shows the variation in the bit error rate performance of an optical signal processing device according to an embodiment of the invention for different feedback strengths and phase delays of the optical signal processing units.

FIG. 18, including FIGS. 18*a* and 18*b*, shows the bit error rate performance of an optical signal processing device according to an embodiment of the invention when used as a receiver of a fibre communication channel of various transmission lengths.

Figure 1:
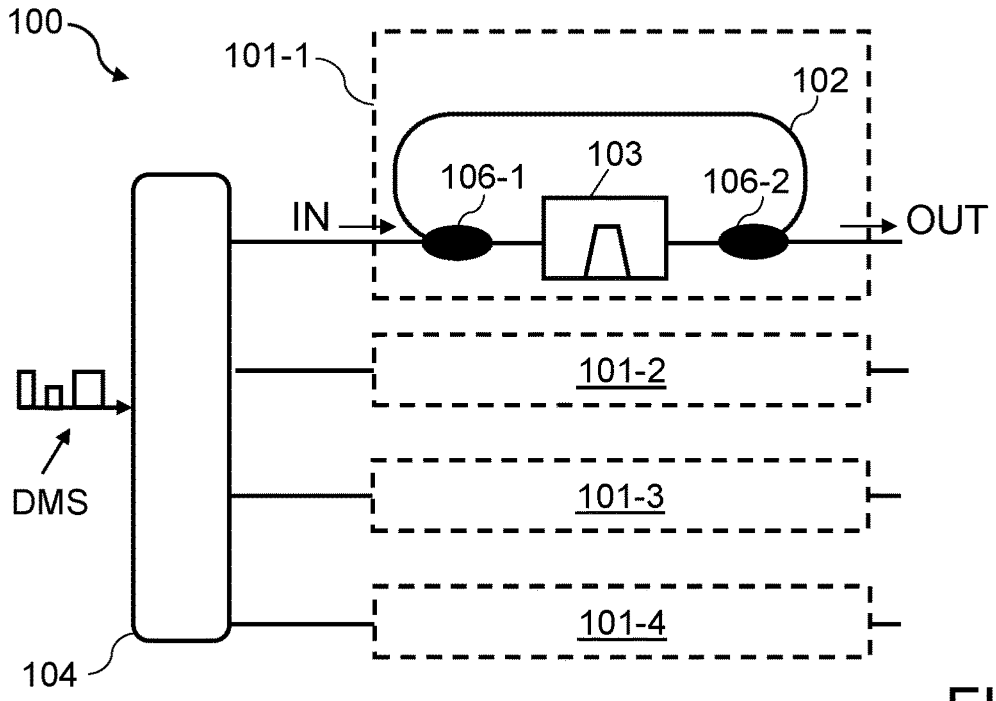
FIG. 1 shows a photonic integrated circuit with three optical signal processing units according to an embodiment of the invention.

The drawings are only schematic and are non-limiting. In the drawings, the size of some of the elements may be exaggerated and not drawn on scale for illustrative purposes. The dimensions and the relative dimensions do not necessarily correspond to actual reductions to practice of the invention.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term “comprising”, used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression “a device comprising means A and B” should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art.

In the description provided herein, numerous specific details are set forth. However, it is understood that embodiments of the invention may be practiced without these specific details. In other instances, well-known methods, structures and techniques have not been shown in detail in order not to obscure an understanding of this description.

Definitions

A RF-modulated optical carrier signal refers to a time-varying signal that has one or two modulation sidebands at one or each side of an optical carrier frequency. For double-sideband signal modulation techniques, the RF-modulated carrier signal has a lower and an upper frequency sideband with identical frequency content that are centered at the optical carrier frequency, whereas for single-sideband signal modulation techniques, either one of the lower and an upper frequency sideband is suppressed. Moreover, the RF-modulated carrier signal may have a strongly suppressed optical carrier in the case that carrier-suppressed modulation techniques are used to generate the RF-modulated signal. Such carrierless or carrier-suppressed optical signals are still considered RF-modulated optical carrier signals for the purpose of the present invention. The RF-modulated carrier signal may be a digitally modulated optical carrier signal, e.g. digital OOK, PAM, QAM, PSK, or FSK. A frequency of the optical carrier may be comprised in the visible, the near-infrared, the mid-infrared or the terahertz region of the electromagnetic spectrum. A single-sideband spectral width, e.g. as characterized via the 3 dB bandwidth or 95% cumulative spectral power (integrated power spectral density), is generally comprised in the GHz range, e.g. in the range from 1 GHz to 350 GHz, and preferably in the range from 10 GHz to 100 GHz.

A broadband optical input signal, including wideband spectroscopic or sensory signals, in the context of the present invention, has a 3 dB optical bandwidth that is at least of the order of hundreds of megahertz and, more preferably, is in the gigahertz region. The broadband optical input signal is a band-limited optical signal, which means that its frequency support on a background noise floor at the photonic integrated circuit input is finite. The broadband optical input signal may be generated by fast frequency-swept laser light sources or pulse chirping, e.g. as envisaged in ultrafast optical coherence tomography applications.

In embodiments of the present invention, optical bandwidths of signals and filters are characterized by the 3 dB bandwidth, i.e. their full width at half maximum. Bandwidth limitations of optical input signals and filters that are formulated by the 3 dB criterion can also be formulated in terms of a more stringent criterion, for example in terms of the 10 dB, 20 dB or 60 dB bandwidth, or, if optical input signals with a lobed spectrum are used, in terms of the first lobe's spectral extent.

A generic photonic integrated circuit (PIC) for optical transient computing applications, including inter alia time series prediction, optical dispersion compensation of digitally modulated carrier signals in fiber-based telecommunication links and/or mitigation of inter-symbol interference (ISI) effects in in fiber-based telecommunication links with restricted channel bandwidth, is described with reference to FIG. 1. Component of the photonic integrated circuit 100 may be formed in or on the surface of a substrate, for instance a silicon-on-insulator substrate, a silicon nitride-on-insulator substrate (e.g. a multilayered substrate structure comprising a layer of silicon nitride, a layer of silica and a layer of silicon), a sapphire substrate, a III-V semiconductor substrate (e.g. a generic InP platform), a glass substrate (e.g. silica), a high-resistance silicon substrate, or a polymer substrate (e.g. high-density polyethylene substrate). The PIC 100 contains at least two, e.g. four, processing units optical signal processing units 101-1 to 101-4, which all have an input connector connected to a signal splitter 104, e.g. a 1×4 star coupler or a two-staged tree of 1×2 splitters (e.g. directional couplers or multimode interferometers). Processed input signals are output at an output connector of each processing unit. Each signal processing unit is thus adapted to receive and process an RF-modulated carrier signal, e.g. a digitally modulated carrier signal, DMS, in parallel. Although four optical signal processing units are depicted in FIG. 1, this particular number of processing units is not limiting. For instance, the PIC may contain only two processing units or may contain up to N distinct and parallelly operable signal processing units, where N is preferably, but not necessarily, less that twenty.

A more detailed view of a processing unit is shown with respect to the first processing unit 101-1, but the same inner structure is found in the three other processing units 101-2 to 101-4 too. Optical signal processing unit 101-1 comprises an optical filter device 103, e.g. a bandpass filter, and a feedback delay element 102 connected between a filter output and a filter input. More specifically, the present embodiment proposes a loop waveguide having one end connected to the filter device input, via input coupler 106-1, and the other one end connected to the filter device output, via output coupler 106-2. One of the input ports of input coupler 106-1, e.g. a 2×1 combiner structure, also acts as input connector for the modulated PIC input signal DMS, whereas one of the output ports of output coupler 106-2, e.g. a 1×2 splitter structure, acts as output connector of the signal processing unit.

Preferably, the group delay Tg=dφ/dω induced by the delay element 102 is in the picosecond range, e.g. from about 1 ps to about 100 ps. For a delay waveguide having length L and effective refractive group index n, the group delay is given as Tg=L*n/c. The group delay may be tunable in some embodiments of the invention, for instance by means of a phase shifter arranged along the delay element. The filter device 103 may be a single-stage or multi-stage bandpass filter, i.e. consisting of a single filter unit or being synthesized of a plurality of filter sub-units that are connected in series or in parallel, and has a characteristic 3 dB passband bandwidth (i.e. FWHM) below 200 GHz, e.g. between 0.5 GHZ and 200 GHz. Together, the delay element 102 and the filter device 103 form an optical cavity or resonator, in which filter output light is coherently fed back to the filter input after having been delayed by the delay element 102. Expressed differently, each signal processing unit comprises a feedback cavity and a filter device arranged within this cavity to enable filtering of the light coupled into the cavity, e.g. a waveguide-based resonator structure with linear or ring-type topology and a filter device formed into, or otherwise coupled to the waveguide. The free spectral range (FSR) associated with each feedback cavity, including the group delay contribution from the filter device, if any, is generally comprised in the range from 10 GHz to 200 GHz, and the 3 dB passband bandwidth of the filter device positioned in this cavity is less than, or equal to, the FSR. Additionally, the center frequencies of individual filter device passbands are frequency-offset with respect to each other, as will be explained further below. This enables spectral filtering or slicing at different frequency position across the RF-modulated signal spectrum, e.g. the Fourier spectrum of the digitally modulated input signal DMS, which is supplied to each one of the at least two signal processing units. The frequency offset between neighboring filter passbands, belonging to two distinct signal processing units, may be in the range from 1 GHz to 100 GHz and is generally dependent on the number N of processing units provided in the PIC and on the spectral width (e.g. 3 dB bandwidth) of the individual filter passbands. For instance, the 3 dB optical bandwidth of each filter passband may be determined as FSR/N or FSR/(N−1) if the PIC uses N processing units.

Figure 2:
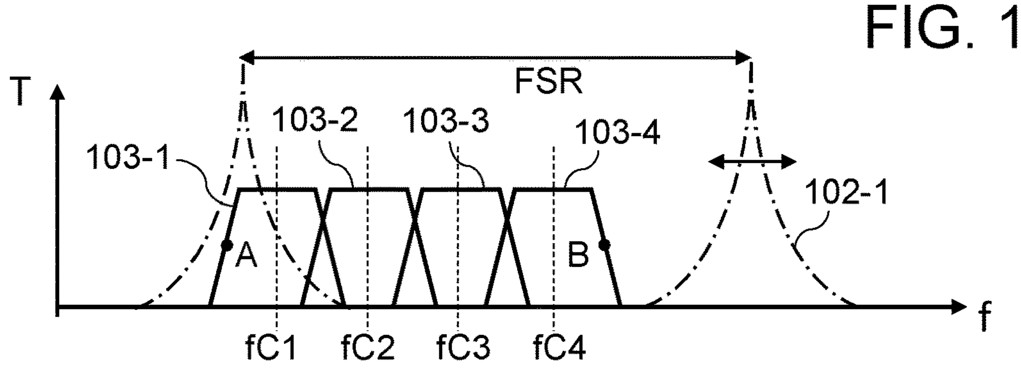
FIG. 2 explains the spectral relationships between the different filter devices of the photonic integrated circuit as well as the effect of coherent feedback through the delay element.

FIG. 2 explains the spectral relationships between the individual transfer functions of the filter devices pertaining to different optical processing units, as well as between the filter device transfer function and the cavity FSR in respect of each signal processing unit considered in isolation. In FIG. 2, the spectral transmittance curve of each filter device 103-1 to 103-2 is plotted as a function of frequency. The different center frequencies fC1-fC4 associated with the four filter devices 103-1 to 103-4 are offset relative to each other; yet, adjacent filter passbands are allowed to partially overlap. The amount of partial overlap with respect to two adjacent filter bands may be up to about 50%. Here, an overlap of adjacent filter bands is understood as the amount of filter bandwidth, e.g. as measured at the 3 dB point, that is common to both filter bands. As an example, neighboring filter bands with a 3 dB cross-over, i.e. crossing one another at the 3 dB point, do not overlap, e.g. 0% overlap, whereas two adjacent filter bands are overlapping by 50% if the center frequency of one of the two filter bands is collocated, on the frequency axis, with the 3 dB point of the other one of the two filter bands. Partially overlapping filters provide the possibility to spectrally filter different portions of the RF-modulated carrier signal spectrum and at the same time to accept and use a larger fraction of the RF-modulated carrier signal spectrum in each signal processing unit (e.g. improving detectable output signal power on the receiver photodiode). Preferably, the individual filter passbands are arranged contiguously on the frequency axis, as illustrated in FIG. 2. This means any two successive filter bands are partially overlapping or crossing at their 3 dB points. This avoids to leave any blanks on the frequency axis, where no filtering is performed and where information carried by the frequency components of the RF-modulated carrier signal situated in the blank spaces would be lost. However, embodiments of the invention may provide application-specific blank spaces intentionally, e.g. by leaving out signal processing units or by increasing a the frequency offset between two adjacent filter bands, where no filtering is desirable. This may be the case, for instance, in carrier-suppressed modulation input signals for which a priori knowledge of frequency gaps in the input signal spectrum is available and can thus be exploited. The leftmost and the rightmost filter band in FIG. 2 respectively define a lower limit A and an upper limit B for the frequency components that are susceptible to be processed by the ensemble of signal processing units. In other words, the frequency interval defined by lower and upper frequency limits A, B constitutes the acceptance or system bandwidth of the PIC. Therefore, application-specific embodiments may differ in the amount of system bandwidth they provide, since it is desirable to provide enough system bandwidth to accommodate the entire RF-modulated carrier signal spectrum, but not much more in order to save costs and resources (e.g. design space on the PIC). For example, a digitally double-sideband modulated input signal to the PIC which uses NRZ-OOK at a bit rate B usually has an associated optical passband bandwidth of approximately 2 B. In this case the system bandwidth of the particular PIC may be selected to be 2 B as well, or slightly more in order to provide some safety margins. In contrast thereto, a PIC for PAM-4 digitally double-sideband modulated input signals with baud rate B, according to the IEEE 802.3bs standard for optical reference receivers (ORR), requires only about 1.37*B of system bandwidth (i.e. about 0.67*B single-sided bandwidth). In embodiments of the invention, the cross-over points between adjacent filter bands may be distributed uniformly over the system bandwidth, e.g. at regular intervals. Yet other embodiments of the invention may provide filter devices with varying passband bandwidths such that the cross-over points between adjacent filter bands are distributed non-uniformly over the system bandwidth.

In addition to the individual filter bands 103-1 to 103-4 of the filter devices, FIG. 2 also shows the transmittance curve 102-1 for the feedback cavity in the first signal processing unit under the assumption that the filter device 103-1 is replaced by an all-pass waveguide portion whose phase and group delay is equivalent to the phase and group delay of the filter device at center frequency. This assumption is only valid near the center frequency; farther away from the center frequency, the decrease in the filter device transmittance modulates the cavity losses and the change in the phase response modulates the cumulative optical path length of the cavity. On the other hand, a resonance peak of the feedback cavity is capable of emphasizing an edge of the filter band and attenuating the passband region, whereby the 3 dB bandwidth of the filter device is effectively increased. However, the assumption can be used as a good first approximation to a broadband Mach-Zehnder interferometer, for instance. The transmittance curve of the feedback cavity shows characteristic resonance peaks, separated by the cavity free spectral range FSR. In embodiments of the invention, the FSR for each signal processing unit is generally comprised in the range from 10 GHz to 200 GHz and is larger than the 3 dB bandwidth of the filter device. Besides, the FSR for each signal processing unit is generally comparable to the system bandwidth and is preferably larger than the system bandwidth. For instance, the FSR for each signal processing unit preferably amounts to two to ten times the system bandwidth. On the other hand, the cavity finesse F calculated for the passband region of the filter device preferably is F≥2*K, wherein K is larger one of the number of signal processing units and the system bandwidth divided by the smallest 3 dB filter bandwidth of the PIC. This relation between the FSR of a single processing unit and the system bandwidth enables averaging of high-frequency noise contributions in the RF-modulated carrier signal and enhancing of short-term transients changes in the RF-modulated carrier signal at the same time. For digitally modulated input signals, e.g. bit or symbol pulses, the cavity of the signal processing unit thus operates in a transitional regime between ballistic pulse transport and self-interference.

Figure 8:
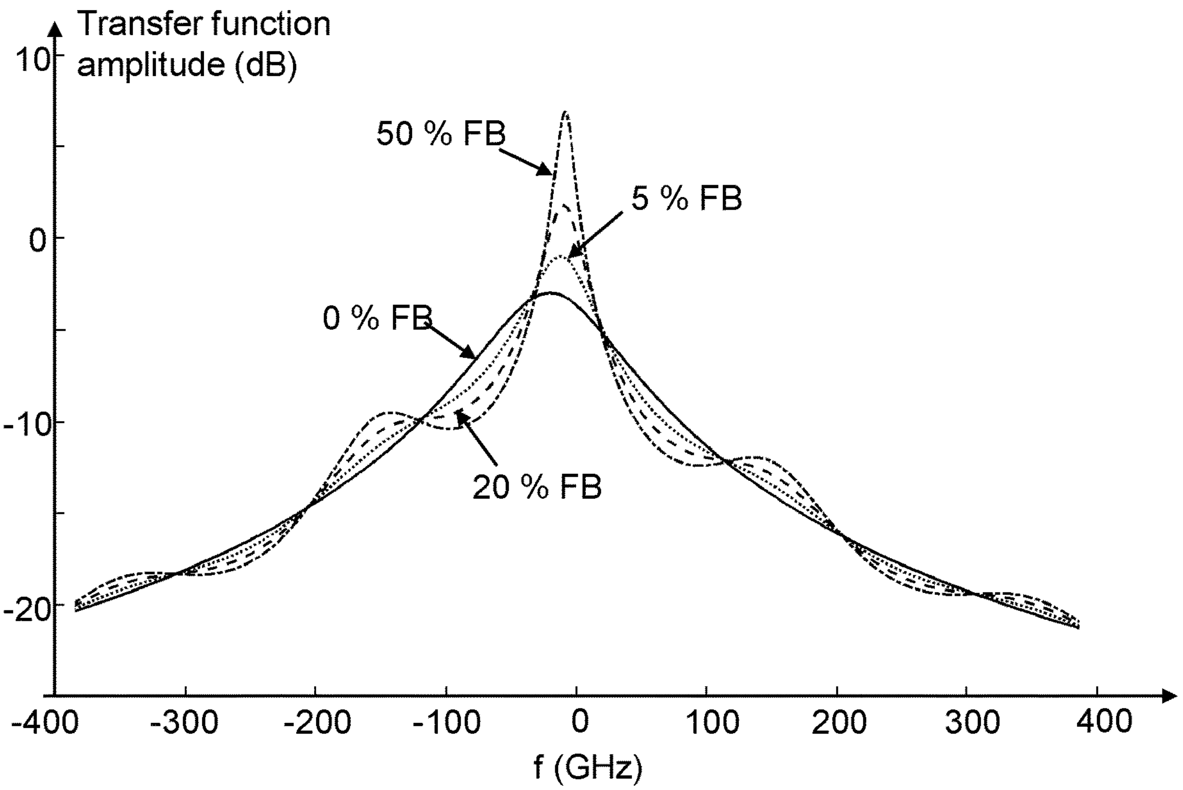
FIG. 8 illustrates the transfer function of an exemplary optical signal processing unit under different feedback conditions, in accordance with embodiments of the invention.

In embodiments of the invention, the signal processing units are adapted for resonant coupling the filter device to the feedback cavity. Resonant coupling is achieved if one of the cavity resonance peaks is brought into spectral overlap with the filter band. This may be guaranteed by proper design of the delay element and the filter device (e.g. tight control of the center frequency), or may be established by means of a phase shifting element (e.g. phase modulator) that is functionally coupled to the delay element. Alternatively, the intracavity losses may be modulated, e.g. via a variable optical attenuator, or the coupling coefficient for the coupling of input light into the cavity may be modulated such that the cavity finesse can be controlled. A lower finesse signifies broader resonance peaks, which facilitate the spectral overlap with the filter band. The coupling of filter response and feedback cavity response leads to a more complex, combined transfer function of the signal processing unit, which has the advantage of resonantly enhancing particular frequency components of the filter band. Broader resonance peaks of a low-finesse cavity (e.g. finesse below 30, e.g. below 10, e.g. between 3 and 10) enhance a wider range of frequency components, but at a smaller amplitude as compared to higher-finesse cavities. An exemplary transfer function of the signal processing unit is shown in FIG. 8. In general, the transfer function H of a feedback cavity with filter device can be modelled as:

$$H(\omega) = \frac{-\sqrt{\rho}\, H_{fil}(\omega)}{1 - \sqrt{S}\, H_{fil}(\omega) e^{j\omega T_{\phi}}}.$$

Here, $H_{fil}$ is the transfer function of the filter device, ρ is the mean coupling ratio for coupling light in and out of the cavity, S is the photon survival factor for the cavity (i.e. the fraction of the intracavity power that is not lost after one roundtrip) and $T_{\varphi}$ is the cavity roundtrip phase delay (i.e. cavity length divided by average phase velocity). For dispersive delay elements, the cavity roundtrip phase delay $T_{\varphi}$ is itself a function of frequency (e.g. through material index dispersion and waveguide geometry index dispersion). However, for weakly dispersive or dispersion-free delay elements, the roundtrip phase delay $T_{\varphi}$ is approximately independent of frequency and substantially equal to the cavity roundtrip group delay.

In the present example, the filter devices 103-1 to 103-4 have been designed to have identical transmittance curve shapes and amplitudes. Such a uniform approach to the design of the filter units may be preferred, because it leads to less complex overall design of the filter devices and reduces the impact of design parameter variations in the fabricated PICs. For instance, the parameter variations of a more uniform design of the filter devices may lead to more predictable filter device performance if test designs with fewer filter parameters, and hence reduced parameter space, can be assessed more easily or modelled and simulated (e.g. Monte-Carlo sampling) more easily. However, different embodiments of the invention may provide filter devices that have different transmittance shapes. For instance, some of the filter devices are flat-top, while others are peaking more pronouncedly or have less uniform/non-flat passbands. There may also be a first set of filter devices in the PIC which have a first passband bandwidth that is smaller than a second passband bandwidth with respect to a second set of filter devices in the PIC. Alternatively, the transmittance curves of the at least two filter devices may be scaled versions of each other, e.g. a 3 dB passband bandwidth may be scaling as 1:2:4:8 for the four filter devices comprised by four corresponding signal processing units.

Filter devices in accordance with embodiments of the invention may be provided as peaking or notching comb filters, i.e. filters which have a periodic transfer function, or as aperiodic bandpass or band rejection filters. A two-arm Mach-Zehnder interferometer (MZI), an add-drop microring resonator (MRR), a Fabry-Pérot etalon, arrayed waveguide gratings, or combinations thereof can be used to implement periodic filter devices in the PIC, whereas a Bragg grating (e.g. an apodised and/or chirped Bragg grating) or a Vernier-type combination of two periodic filter sub-units with slightly differing periods may be used to implement aperiodic or quasi-aperiodic filter devices in the PIC. Filter devices with a period transfer function preferably have a free spectral range (i.e. frequency/wavelength period) which exceeds the system bandwidth. For Mach-Zehnder interferometer based filter devices with two complementary output ports, e.g. cross and bar port, the delay element may connect to any one of these two ports, provided that the phase delay is adapted accordingly, e.g. prior by design or by the use of phase shifters during use. With regard to MRR-based filter devices, a peaking comb filter configuration can be obtained by using a drop-port configuration of the MRR, e.g. the filter outputs are provided at the drop bus waveguide of the MRR, which is connected to the delay element, whereas filter inputs are supplied via the input bus waveguide of the MRR. In contrast thereto, a notching comb filter configuration (narrow bandstop filter) can be obtained by using a through-port configuration of the MRR, e.g. the filter outputs are provided at the same input bus waveguide that also receives the filter inputs and the delay element is connected to the input bus waveguide at both ends thereof, or the input bus waveguide is an integral part of the delay element. A roll-off in the filter bands, i.e. a steepness in the transfer function of the filter devices characterizing the transition between the passband and the stopband, may be 20 dB/decade or more (e.g. 40 dB/decade), corresponding to first-order or higher-order filters. Phase shifters or electric heaters may be incorporated into the filter devices to enable frequency-tuning of the filter band associated with the filter device. This can be advantageous in embodiments in which fabrication variations are too important to obtain precisely determine the location of the filter band center frequencies beforehand. However, the tunability of the filter bands also allows to accurately control the frequency offset between two or more filter bands, to control a regular spacing and/or partial overlap between adjacent filter bands, etc.

Figure 3:
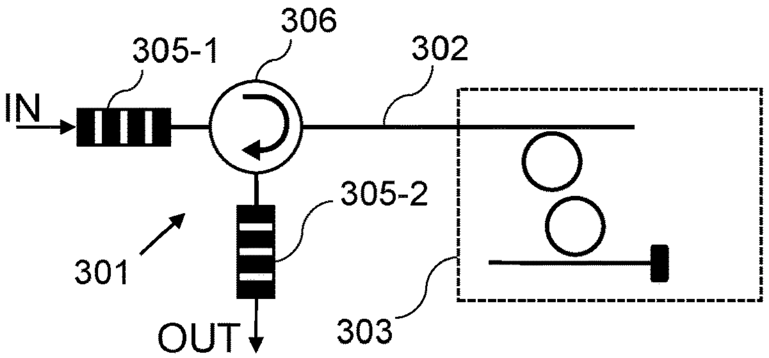
FIG. 3 to FIG. 7 show different implementations of optical signal processing units that can be used in embodiments of the invention.

With reference to FIG. 3, a possible implementation of an optical signal processing unit 301 is now described. An optical isolator 306, e.g. an integrated three-port isolating device being part of the photonic integrated circuit 100, receives the RF-modulated carrier signal, e.g. a digitally modulated signal DMS, via a partially reflective input terminal 305-1 of the signal processing unit and supplies it to the filter device 303. The optical isolator may be realized by waveguide integration of a magneto-optic garnet material or through non-reciprocal integrated photonic circuitry that uses externally applied stimuli to break time-reversal symmetry, e.g. as described in Sohn, D. B., Kim, S. & Bahl, G. "*Time-reversal symmetry breaking with acoustic pumping of nanophotonic circuits", Nature Photon* 12, 91-97 (2018) or Sounas, D. L., Alù, A. *Non-reciprocal photonics based on time modulation. Nature Photon* 11, 774-783 (2017). The filter device 303 is configured to operate in reflection mode, meaning that filter inputs and filter outputs are passed through a same input/output port of the filter device, which in the present case is a bidirectional port. Therefore, filter output signals are also received by the isolator 306 and directed towards a partially reflective output terminal 305-2. Since the filter device 303 only has a single, bidirectional input/output port, the isolator 306 is provided to separate the processed output signals from the coherent combination of not yet processed input signals and previously output filter signals. Alternatively, other optical components, such as a 1×2 splitter/combiner, can be used to achieve this signal separation.

The partially reflective input and output terminals 305-1 and 305-2 may be provided as distributed Bragg reflectors for which the number of periods (e.g. layer pair period or grating period) and/or the refractive index contrast can be selected such that a desired amount of reflectance/transmittance is obtained. Alternatively, the intrinsic reflection properties of interfaces between two different waveguide properties can be used to achieve the degree of input and output coupling to the signal processing unit 301. In some embodiments of the invention, the reflectance/transmittance of the partially reflective terminals 305-1, 305-2 is thus fixed by design, but may be adjustable in different embodiments. For instance, a DBR grating may be tunable by refractive index tuning, e.g. through a thermal or electrical stimulus which act on the DBR through the thermo-optic or carrier-depletion effect.

The delay element 302 of the signal processing unit 301 has a linear configuration. As opposed to circular or looped configurations, which will be described further below, the linear configuration may be implemented in a more compact way on the PIC, thus saving chip area and also avoiding any waveguide bend losses. In a linear feedback cavity, the filter output signals thus travel twice along the delay element 302, e.g. a delay waveguide, before being fed back into the filter device 303. The first travel is in a forward direction and the second travel in a backward direction, opposite to the forward direction. In the exemplary signal processing unit 301 of FIG. 3, the optical delay element 302 typically corresponds to an integrated waveguide, e.g. strip, ridge, or buried dielectric or semiconductor waveguide. Ideally, the waveguide is formed from a wide-bandgap material to lower nonlinear absorption losses. However, embodiments of the invention are not limited to aforementioned waveguide types and other types of integrated waveguide may be selected instead, e.g. photonic crystal waveguides or coupled resonator waveguides. A bidirectional input/output port of the filter device 303 is connected to the end of the delay element 302 opposite to the partially reflective input terminal 305-1. This way, filter inputs are applied to the filter device 303 at the same position along the delay element 302, where also filter outputs are received. Here, the linear configuration of the delay element 302 imposes that the filter device 303 itself is operating in reflection mode vis-à-vis the delay element. As a result, filter outputs are delayed while propagating along the delay element. The continued feedback by the delay element, in combination with the reflective character of the filter device, achieves the same effect as, and can indeed be considered as equivalent to, a linear resonator/cavity in which the filter device acts as one of the cavity mirrors. The resultant coupling of the filter device and the thereto connected cavity enables the resonant enhancement of filter outputs, which then can be detected with an increased signal-to-noise ratio.

The filter device 303 contains two series-connected micro-ring resonators (MRRs), each of which is coupled to a different bus waveguide. The bus waveguide coupled to the first MRR may be a simple extension of the delay element waveguide, while the bus waveguide coupled to the second MRR comprises a reflective end portion. This reflective end portion may be provided as a reflective rear facet of the bus waveguide, for example, or as a DBR element that is connected to, or imprinted into, the bus waveguide. The skilled artisan is aware of that further solutions for obtaining a reflective end portions exist, e.g. a waveguide-based loop mirror or other mirror-like arrangements. Preferably, the reflectance of the bus waveguide end portion is large, e.g. above 90%, e.g. 99% to 100%, to minimize insertion losses of the filter device. The filter device 303 exploits the reflective end portion of the second bus waveguide (also called drop waveguide) to realize a double-pass configuration with respect to the two side-coupled MRRs, which is beneficial for obtaining a notching comb filter with a steeper transition band or roll-off and/or with a flatter passband without having to provide a composite filter device that includes several filter sub-units. Here, a notching comb filter designates a transfer function of the filter device which comprises multiple notches, separated by the free spectral range FSR associated with the combination of two coupled MRRs. The filter device 303 is not limited to the use two coupled MRRs, but may use single-stage or cascaded interferometers (Mach-Zehnder interferometers, multi-path interferometers), cascaded MRRs, or combinations thereof.

Figure 4:
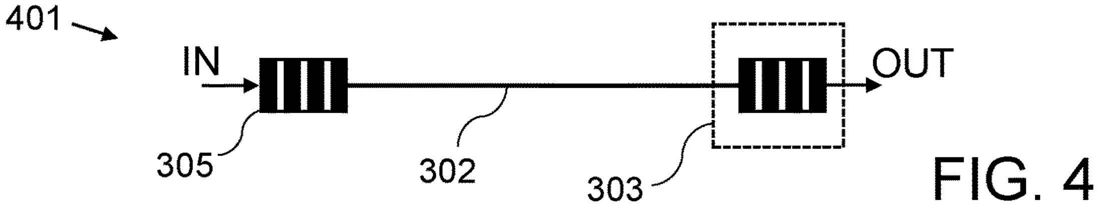

FIG. 4 shows an alternative optical processing unit 401, in which the RF-modulated carrier signal and the processing unit output signal are also passed through distinct terminals for input and output respectively, but in which no additional partially reflective output terminal is required. Instead, the filter device 403, still operating in reflection mode vis-à-vis the delay element 302, also plays the role of an output coupler of the cavity. This is feasible if the reflectance of the filter device is less than 100%, e.g. between 70% to 95%, admitting a small fraction of the filtered intracavity light to exit the signal processing unit 301. For instance, a specifically designed Bragg mirror or Bragg grating, e.g. a DBR, or even butt-coupled Fabry-Pérot interferometer with increased transmittance in the stopband acts as a bandwidth-limited cavity mirror with reduced reflectivity. In contrast to the limited bandwidth of the reflective filter device 403, the partially reflective input terminal 305 preferably has a much broader reflection band or even a frequency-independent reflectance value across the entire system bandwidth. It is an advantage of the present embodiment that no optical isolator or other signal-separating element is required. This simplifies the design, saves chip area and decreases the overall insertion losses of the signal processing unit. It is noted that the same advantage can be achieved in the previous embodiment of FIG. 3, provided that the end portion of the drop waveguide is not made 100% reflective.

Figure 5:
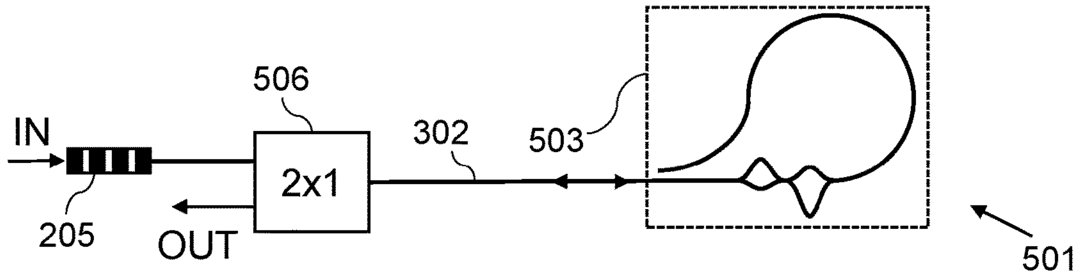

FIG. 5 shows a variation of the optical processing unit of FIG. 3. Instead of an optical isolator, a 2×1 splitter/combiner 506 is used to separate the counterpropagating input and output signals of the optical processing unit 501. Moreover, the filter device 503 of processing unit 501 contains a waveguide-based loop mirror, which is connected to the delay element 302 to receive filter inputs from and to re-inject filter outputs into the same. A cascaded Mach-Zehnder interferometer unit is disposed along the loop mirror and defines the transfer function and filter band of the filter device.

Figure 6:
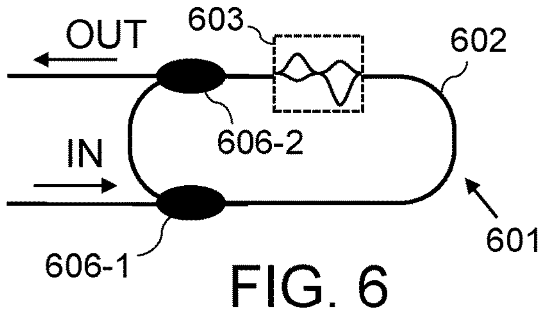
Figure 7:
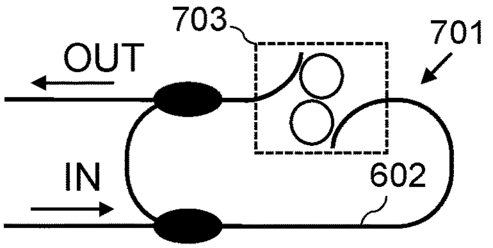

FIG. 6 and FIG. 7 are further examples of optical signal processing units that can be part of the photonic integrated circuit 100. They relate to delay elements 602 that have a loop configuration. That is, the optical delay element 602 of these processing units is connected between an output port and an input port of the filter device, which are distinct for the present embodiment and, preferably, are also unidirectional. As a result, the filter output signals travel only in one direction along the delay element 602 before they are fed back into the filter device. In comparison to the preceding linear cavity topologies, the ring topology is a travelling wave resonator and has the advantage that nonlinear effects caused by standing-wave patterns are largely absent. The signal processing units 601 and 701 use an input coupler 606-1 and an output coupler 606-2 to couple RF-modulated carrier input signals into the cavity and processing unit output signals out of the cavity respectively. The set of couplers may be implemented as directional couplers or 1×2 splitter/combiners with a fixed coupling ratio each. Alternatively, one or both couplers 606-1, 606-2 may be configured to allow the respective coupling ratio to be adjusted by an external control signal. For instance, one or both couplers 606-1, 606-2 may be implemented as Mach-Zehnder interferometers for which a second interferometer arm is locally coupled to the delay element 602 at two distinct point thereof and is comprising a phase shifter. Controlling the amount of phase shift in the coupled second interferometer arm allows the direct control of the amount of optical power coupled into or out of the cavity. The filter device 603 of FIG. 6 consists of two cascaded Mach-Zehnder interferometers, whereas the filter device 703 of FIG. 7 is based on two series-connected MRRs. The ring topologies of the present embodiments are not limited to the particular filter devices indicated in the drawings. Other filter device architectures may be used instead.

Typical spectral transfer functions for one of the optical processing units have been calculated for different feedback strengths FB along the delay element and are shown in FIG. 8. Here, the feedback strength FB corresponds to the survival factor for photons that have performed a complete roundtrip, i.e. the remaining portion of intracavity optical power that, starting from the filter device input port, is not lost (absorbed, dissipated, radiated, etc.) when returning back to the same input port. This definition of the feedback strength includes possible insertion losses that originate from the filter device, as well as all the photon losses imparted by the couplers. A feedback strength FB of 0% corresponds to an open delay loop and merely serves as a point of comparison, because delay loops in embodiments of the invention are not interrupted. Besides, the reference curve of 0% FB simply reflects the transfer function of the filter device; in this case, a bandpass filter with full 3 dB bandwidth (i.e. FWHM) of about 70 GHz. As the feedback strength is increased along the delay element, strong power built-up of the resonant cavity modes is observed.

Figure 9:
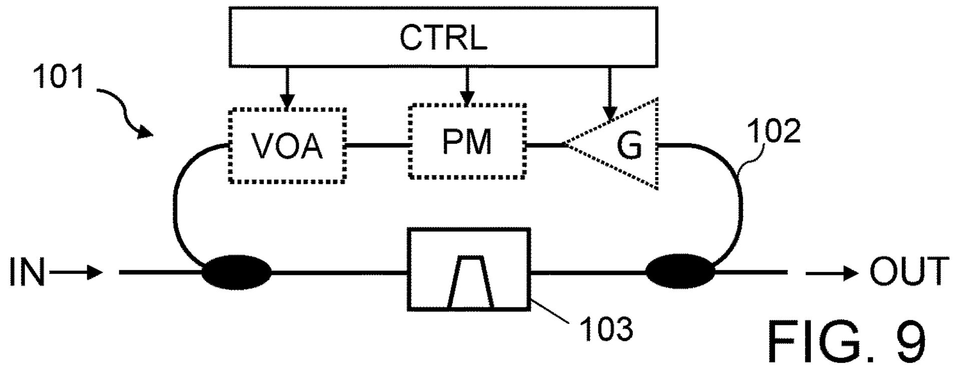
FIG. 9 shows an optical signal processing unit with additional optical components that offer increased functionality, which can be used in embodiments of the invention.

FIG. 9 illustrates additional optical components that can be arranged along the delay element 102 of the optical processing unit 101 in accordance with some embodiments of the invention, regardless of the particular filter device 103 or input/output coupling scheme employed for this processing unit. For instance, a variable optical attenuator VOA and/or an optical gain element (e.g. travelling wave semiconductor amplifier) with controlled gain "G" can be used to tune the feedback strength of the delay element 102. A gain element may be advantageous in embodiments in which insertion losses of the filter device and/or coupling losses are important or cannot be avoided, e.g. in technology platforms for which integrated waveguides are inherently more lossy. In such cases, the gain "G" of the gain element can be adjusted to partially compensate these excess losses. The variable optical attenuator may be used in isolation or in combination with the gain element to set an application-dependent optimal feedback strength of the processing unit, whereas a phase modulator PM enables control of the spectral positioning of the feedback resonances. To this end a controller CTRL issues control signals to the tunable elements of one or more processing units, e.g. the variable optical attenuator, phase modulator and/or gain element. In particular, the controller is configured to limit the gain "G" to be inferior to the cavity round trip losses at the filter center frequency, thereby ensuring that the cavity stays well below the lasing threshold, if this is not already guaranteed by a specific gain-limiting design of the gain element. It is noted that the feedback strength also allows the control of the finesse of the cavity that is formed by the filter device with delay element. Further to the additional components described in this embodiment, one or more additional filter devices may be inserted into the cavity, e.g. by connecting each next filter device input to the delay waveguide such that it receives the previous filter device output. This option also exists in respect of all the embodiments as previously described.

In embodiments of the invention, the delay element may be provided as an integrated strip or ridge waveguide. Preferably, the delay waveguide is single-mode, allowing more compact designs. For multi-mode delay waveguides, the filter device may consist of several independent filter subunits which have closely-matched transfer functions, but which are mode-matched to provide filtering only in respect of one of the plurality of waveguide modes. Alternatively, a filter device may be designed to act invariantly on the plurality of waveguide modes (e.g. cascaded two-arm Mach-Zehnder interferometers) and may be augmented by one or more phase compensation sections (e.g. local waveguide thickness changes in the interferometer arms), which equalize the optical roundtrip phase of all supported waveguide modes. Multimode waveguides supporting at least two different modes (e.g. fundamental TE and TM mode) may be useful in applications in which two orthogonal modes (e.g. fiber modes) are coupled into the PIC (e.g. butt coupling) such that polarization-dependent losses are avoided or reduced. Alternatively, the PIC may be designed to afford polarization diversity. For example, a 2D grating coupler may be used to partition the different polarization states which can then be directed to distinct sets of optical processing units.

Figure 10:
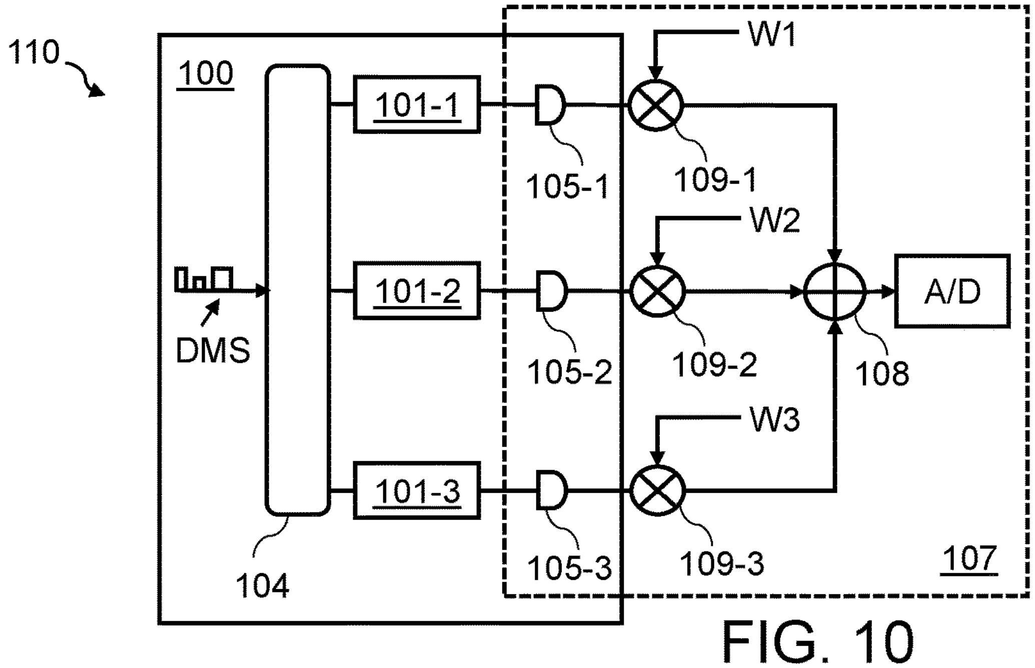
FIG. 10 shows an optical signal processing device comprising the photonic integrated circuit according to an embodiment of the first aspect of the invention and a readout circuit.

FIG. 10 depicts an optical signal processing device 110 based on optical transient computing, e.g. an optical transient computing device, which comprises a PIC 100 in accordance with embodiments of the first aspect. The optical signal processing device may be part of an optical receiver for use in an optical communication link. A programmable and trainable readout circuit 107 of the optical signal processing device is configured to detect the output signals supplied by the plurality of signal processing units and to transform combinations of the detected output signals into at least one readout signal. The readout circuit 107 comprises a plurality of photodetectors 105-1 to 105-3, each of which is connected to an output terminal of a respective one of the plurality of optical signal processing units 101-1 to 101-3. Each photodetector has an optical detection bandwidth at least as large as the 3 dB optical bandwidth associated with the filter band of the filter device in the signal processing unit to which it connects. The photodetectors may be integrated photodetectors, e.g. waveguide-integrated Si, Ge or strained Ge p-i-n photodiode, waveguide-integrated III-V compound semiconductor photodiodes (e.g. InP-based), waveguide-coupled multi-quantum well III-V compound semiconductor photodiodes, which are part of the PIC 100. Alternatively, avalanche photodiodes with a high internal gain may be provided, e.g. integrated Si-based, Ge-based, InGaAs-based or InP-based avalanche photodiodes as part of the PIC 100. Although their optical bandwidth is more limited, the use of avalanche photodiodes may dispense with the need to provide sophisticated transimpedance amplifiers (TIA, not shown in FIG. 10) for amplifying the photocurrents produced by the photodetectors in response to the received optical input signals. With regard to very large optical bandwidths, ultra-fast travelling wave and UTC-photodiodes may be used instead.

An individual weights W1-W3 is then applied to each photodetector signals, or amplified versions thereof, before an adder unit 108 combines the weighted photodetector signals into a single analog signal. Next, a digital-to-analog converter A/D samples and converts this signal into a discrete-time digital readout signal. Although the readout circuit 107 of the present embodiment only generates one readout signal, more than just one readout signal, e.g. a collection or set of readout signals such as a vector of readout signals, may be generated in other embodiments. For instance, a second set of weights and a second adder unit may be provided to that effect.

Optionally, a digital signal processor can be provided as part of the readout circuit to further process the digital readout signal, or readout signals if more than one is generated by the readout circuit, before outputting it. A simple example of such digital signal processor is a hard decision unit which compares the digital readout signal(s) to one or more programmable thresholds, whereby readout signals are divided into different classes (decision output spaces). For the present embodiment, the transformation of combination of the detected output signals thus corresponds to a linear functional, and more particularly to a dot product between a set of weights, arranged in vector form, and a set of photodetector signals, also arranged into vector form. A constant bias term may be supplied to the adder unit 108 in addition to the weighted photodetector signals.

In a variation of the present embodiment, the photodetector output signal is first converted into corresponding time-discrete digital signals and the dot-product (i.e. the weighting and summing) is carried out in the digital domain. This modification can make use of digital multipliers (or variable gain elements) and a digital adder instead of analog multipliers and adders, which may be more easily implemented with the required accuracy. The drawback is that a separate A/D converter is needed for each photodiode.

The weights to be applied may be stored in a storage unit (e.g. in a digital representation) of the readout circuit (not shown) and corresponding analog signal levels (e.g. obtained by D/A converters) or digital signals (e.g. when the dot-product is performed digitally) are then generated and applied to the weighting units 109-1 to 109-3. Programming the readout circuit 107 may thus consist in supplying a particular set of weight signals to the weighting units with, e.g. by way of writing a new or updated set of weights to the storage unit. The readout circuit 107 is also trainable in the context of weights that can be optimized ab initio or online with respect to a specific application. For example, gradient-descent, reinforcement learning, linear (ridge) regression are training techniques known in the art which can be used to determine, approximate or estimate an optimal set of weights and bias as the unknown training parameters. For training purposes, one or more digital readout signals or further processed, e.g. classified, digital readout signals can be compared to a corresponding target signal, which may be a precomputed training input, and the weights are adjusted based on the comparison. More specifically, a metric such as mean-square error (MSE), cross-entropy (CE) or 0-1 loss is used to measure a deviation between the observed sequence of digital readout samples (predicted/model output set) and the sample sequence of the target signal (target set) and the weights are increased or decreased in a direction which minimizes the measured deviation. Particular techniques as ridge regression modelling allow a closed-form calculation of the optimal set of weights, based on the observed model inputs (i.e. the set of unweighted photodetector signals) and the target sequence, while other techniques like stochastic gradient descent estimate the gradient of the measured deviation with respect to the set of weights. The estimated gradient may be obtained by perturbing the weights while repeatedly applying the same input signal to the PIC, or by using an analytical expression. It is noted that the unweighted or bare photodetector signals can be observed indirectly with a readout circuit as shown in FIG. 10, by setting the weight of the to be observed bare photodetector signal to '1' while setting the remaining ones to '0'. Alternatively, n measurements of the digital readout signal can be collected with respect to n different realizations of the weights, which have to be linearly independent, and the n bare photodetector signals can be obtained by inverting the linear system of equations (generalizable to a nonlinear system if the digital readout signals are further processed and nonlinearly transformed).

Figure 11:
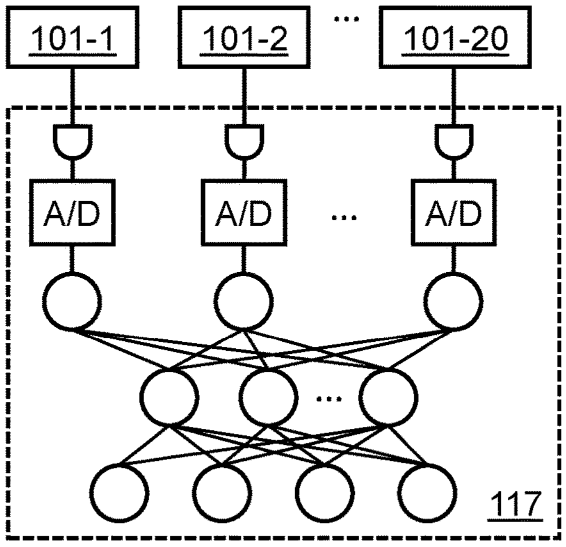
FIG. 11 to FIG. 14 illustrate alternative readout circuits that can be used in an optical signal processing device in accordance with embodiments of the invention.

FIG. 11 shows an alternative readout circuit 117, in which the output signals of twenty signal processing units are detected by a corresponding number of photodetectors and subsequently sampled and digitized by A/D converters. In the present example, the number of A/D converters is equal to the number of photodetectors, but a smaller number of A/D converters can be used in some other embodiments if the photodetector signals are sampled and stored over a brief time interval, sufficient for fast, time-multiplexed A/D conversion. Acquired digital samples are organized into an input vector and applied to the first layer (input layer) of an artificial neural network (ANN). The ANN typically has a feedforward architecture, including the input layer, at least one hidden layer and an output layer. Adjacent layers of the ANN are interconnected by weighted connections, i.e. a signal connection to which a weight is applied, and neuronal units of the hidden layers sum and nonlinearly transform the weighted signals of incoming connections from the preceding layer. The output layer may a linear layer (e.g. only summing of weighted inputs) or may also apply a nonlinearity (e.g. a softmax layer). Nonlinear transformations in the ANN may be implemented by rectifying linear units (ReLus), by sigmoid activation functions, or the like. A particular version of the present embodiment has an ANN output layer that is configured to classify input signals to the PIC, e.g. a softmax layer or a winner-takes-all layer. This is useful in telecommunication applications in which the symbols that are transmitted over a fiberized data link are affected by chromatic dispersion, fiber link bandwidth limitations, and/or nonlinearity of the link. A classification at the ANN output layer then predicts which symbol is the most likely to have been received by the PIC. As an alternative to the ANN, a time-delay neural network or an Elman neural network may be implemented. As explained before, the neural network weights are model parameters of the readout circuit that can be programmed and/or trained. Specific training algorithms for neural networks, such as backpropagation through time, are known in the art.

Figure 12:
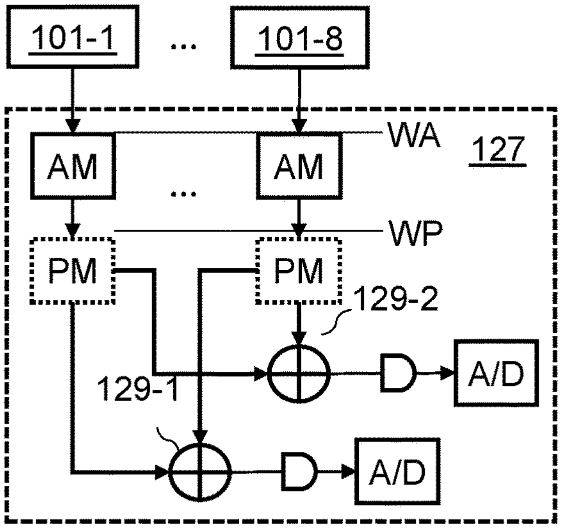

The optical signal processing device and readout circuit 127 of FIG. 12 differs from the previous embodiments in that the transformation of combinations of output signals is performed prior to the detection and A/D conversion of the transformed signals. Whereas the previous embodiments transformed combinations of the signal processing unit outputs in the electrical domain (analog or digital), the present embodiment proposed a readout circuit in which the transformation and combination of signal processing unit outputs is performed in the optical domain. In the example of FIG. 12, the readout circuit 127 comprises an amplitude modulator AM and a phase modulator PM to enable optical multiplication of each output signal of signal processing units 101-1 to 101-8 with a corresponding complex-valued weight: $W_i = WA_i \exp(WP_i)$, i=1, . . . , 8. Two summing nodes 129-1, 129-2 then combine the weighted output signals of the signal processing units. These summing nodes may take the form of a star coupler or a combiner tree, which are adapted to generate a coherent superimposition (coherent interference) of the incoming weighted signals. The so generated set of coherent superimposition signals is then supplied to a corresponding set of photodetectors and A/D converters sample and digitize the photodetector signals generated in response to the received optical superimposition signals. It is observed that the effect of the photodetector response on the supplied optical superimposition signals is that of a square-law unit, which transforms the optical signals into electrical ones under the squared modulus function. The photodetectors can thus be regarded as nonlinear units of a neural network layer. Also in this example, the complex weights $W_i$ (modulus and phase) are model parameters of the readout circuit that can be programmed and/or trained. Known training algorithms like backpropagation through time, evolutionary CMA-ES, or nonlinear inversion as described in WO2018219839 A1 (Bienstman, P. et al.) 2018 Dec. 6, can be used for parameter training (online or offline) and optimization purposes.

Figure 13:
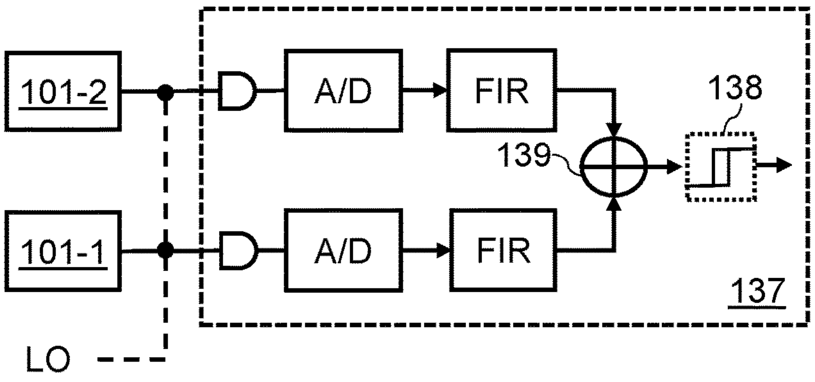

Yet another embodiment of a readout circuit 137 in an optical signal processing device using the PIC is shown in FIG. 13. This readout circuit also comprises a set of photodetectors and A/D converters for detecting, sampling and digitizing the set of output signals received from the plurality of signal processing units 101-1, 101-2 of the PIC. Moreover, the readout circuit 137 comprises a set of two finite impulse response filters FIR (e.g. digitally implemented FIR equalizer) which transform the detected and digitized signals. A filter order M of the FIR filters may be less than 50, e.g. less than 40, e.g. less than 30, e.g. less than 25, e.g. less than 15. The tap weights of the FIR may be subject to additional constraints, e.g. to penalize large magnitude weights or to sum up to one, thus representing a feedforward equalizer (FFE). In variants of the present embodiment, the FIR can be replaced by a FFE, a decision feedback equalizer (DFE), a combination of FFE and DFE, or by higher-order nonlinear versions of the FFE and/or DFE (e.g. Volterra-type nonlinear FFE and/or DFE).

Eventually, the digitally filtered signals are summed by an adder unit 139 and optionally delivered to a decision unit 138, which compares the added signal to one or more programmable thresholds. The added or thresholded added signal constitutes the only readout signal of this embodiment that is output by the readout circuit. Furthermore, the present embodiments illustrates the possibility to provide a local oscillator signal LO, i.e. an optical signal that is substantially equal to the carrier signal of the RF-modulated carrier input signal injected into the PIC, to one or more (e.g. each) of the plurality of photodetectors of the readout circuit. The local oscillator signal LO mixes on the photodetector with the incoming optical signal from the signal processing unit to which the photodetector is connected. In other words, the photodetectors of the readout circuit 137 can be configured as homodyne receivers, e.g. phase-diversity coherent homodyne receiver. The photodetectors in a homodyne receiver may be arranged into pairs of balanced photodetectors. Homodyne detection results in a coherent demodulation of the RF-modulated carrier input signal after it has been processed by the signal processing units of the PIC. This is of particular relevance in applications in which the optical signal processing device is used to correct and/or detect bit errors in the fibre channel of a point-to-point data link that uses digital QAM or M-ary PSK as modulation technique. The local oscillator signal may be provided as an externally supplied signal, e.g. derived from the RF-modulated carrier input signal during modulation, or may be generated locally from the RF-modulated carrier input signal received by the PIC, using known methods in the field, e.g phase-locked loops, Costas loop, multiple-filter-divide schemes, etc. The carrier signal frequency may also be recovered from detected symbols directly, e.g. symbols detected as a result of the multiple thresholding operation of the decision unit 138. For instance, a deviation of the detected symbols from the nominal positions in the modulation constellation diagram can be evaluated and the LO frequency adjusted accordingly. Alternatively, a self-coherent homodyne detection scheme may be used, in which a strong optical carrier is transmitted together with the modulated signal (sidebands) and used as local oscillator signal. Furthermore, the strong optical carrier can be spectrally separated from the RF-modulated signal, e.g. through bandpass filtering at the carrier signal frequency, pre-amplified and then supplied to the photodetectors so as to obtain improved homodyne detection. For digital QAM input signals to the PIC, it is preferred to have at least two adder unit 139 and at least two decision units 138, one detecting phase locations and the other one locating amplitude locations in the constellation diagram. It is an advantage of homodyne detection that phase information of the modulated carrier signal can be recovered and that the modulated RF signal can be amplified to improve the signal-to-noise ratio of the readout circuit. A local oscillator signal can also be supplied to the photodetectors of other readout circuits in accordance with the invention.

Figure 14:
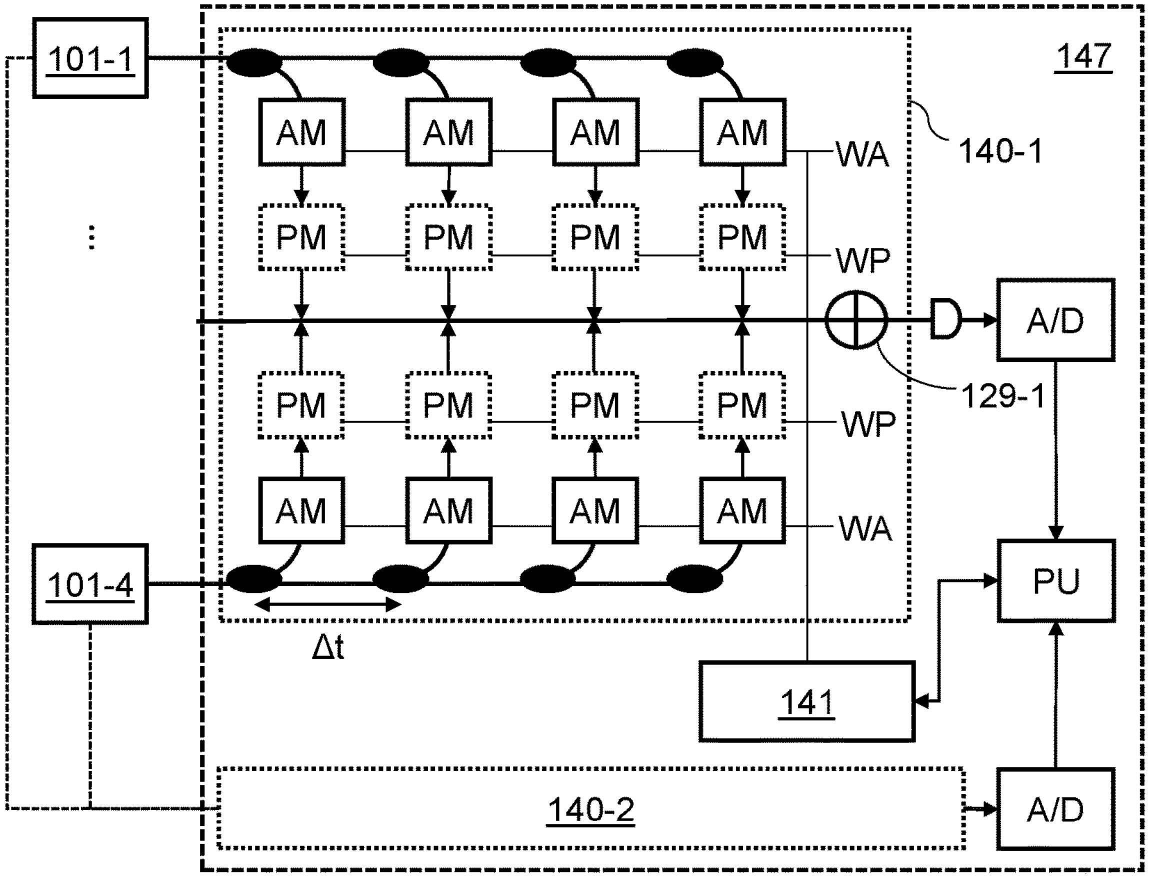

Referring now to FIG. 14, a further embodiment of a readout circuit 147, to be used in an optical signal processing device comprising the PIC of the first aspect, is illustrated. Similar to the readout circuit of FIG. 12, the present readout circuit 147 achieves signal transformation and combination of the signal processing unit output signals in the optical domain. Readout circuit 147 differs from the readout circuit of FIG. 12 in that multiple complex weights $W_i=WA_i\exp(WP_i)$ are applied to the signal output of each signal processing unit 101-1 to 101-4. More specifically, a different complex weight $W_i$ is applied to different delays, $\tau_m=m*\Delta t$, of each signal processing unit output. Expressed differently, the outputs of two or more signal processing unit 101-1 to 101-4 are transformed and combined in at least one optical delay filter unit 140-1, 140-2, before being detected and digitized by a photodetector and A/D converter respectively. The optical delay line filter units 140-1, 140-2 are the optical equivalent to the digital FIRs of FIG. 13, with the difference that the optical signals are analog signals and the filter weights are complex-valued weights. A single summing node 129-1 per optical delay filter unit is used to coherently superimpose the multiple-delayed and weighted output signals of several signal processing units 101-1 to 101-4. In the present and similar embodiments, the unit time delay Δt is usually identical or close to the characteristic time scale of the RF-modulated carrier input signal to the PIC, e.g. the symbol rate of a digitally modulated bit signal. If the RF-modulated carrier input signal has multiple characteristic time scales, the unit time delay Δt of each optical delay filter unit 140-1, 140-2 may be implemented in accordance with an a priori knowledge or estimate of the different time scales. Moreover, the filter order or maximum delay is controlled by the number m of unit delays, which preferably is less than 32, e.g. less than 16, e.g. less than 8. Instead of the tapped optical delay line of the optical delay filter unit 140-1, 140-2, an optical splitter, e.g. 1×m star coupler or splitter tree, can be provided that connects to m distinct waveguides with varying length. More specifically, the length of successive waveguides can differ by one unit time delay Δt.

Readout circuit 147 of FIG. 14 further comprises a storage unit 141, e.g. an on-chip memory module cointegrated with the PIC, which stores the programmed or trained complex weights, for instance as a binary representation of the phase weight WP and the modulus weight WA. The weights can be read from the storage unit 141 upon reception of a read request issued by the processing unit PU of the readout circuit 147. The storage address of each weight in the storage unit 141 is correlated with the position of the phase modulator PM and the amplitude modulator AM on an optical delay line of a particular optical delay filter unit. The retrieved weights are supplied to the corresponding phase modulator PM amplitude modulator AM, e.g. after having been converted by a driver with D/A converter into an analog driver signal. The processing unit PU controls the update of the stored weights in the storage unit 141 during training. It also receives the digital readout signals, which can be used as online training data, from the plurality of A/D converters. The PU is also adapted to predict output signals based on the received readout signals. For instance, the PU may be configured to decide which decoded symbol is the most likely one that has been transmitted over a fibre link of an optical communication system. It follows that in such exemplary embodiments, the processing unit PU is also configured to act as a decoder in respect of a communication channel that implements error correction codes. Conventional decoder architectures and decoding techniques are available and can be used in embodiments of the invention.

In the preceding embodiments, the readout circuit may be provided as a separate electronic circuit or may be provided on a same carrier as the PIC. Alternatively, the readout circuit may be fully integrated with the PIC, e.g. they are integrated on a same chip. Moreover, optical pre-amplifiers may be provided and connected to the output terminal of one or more, e.g. each, optical signal processing unit. Alternatively, the optical pre-amplifiers can be connected in front of each photodetector of the readout circuit. Pre-amplifiers increase the power on the photodetectors, which improves their signal-to-noise ratio and therefore also the performance of the optical signal processing device.

Figure 15:
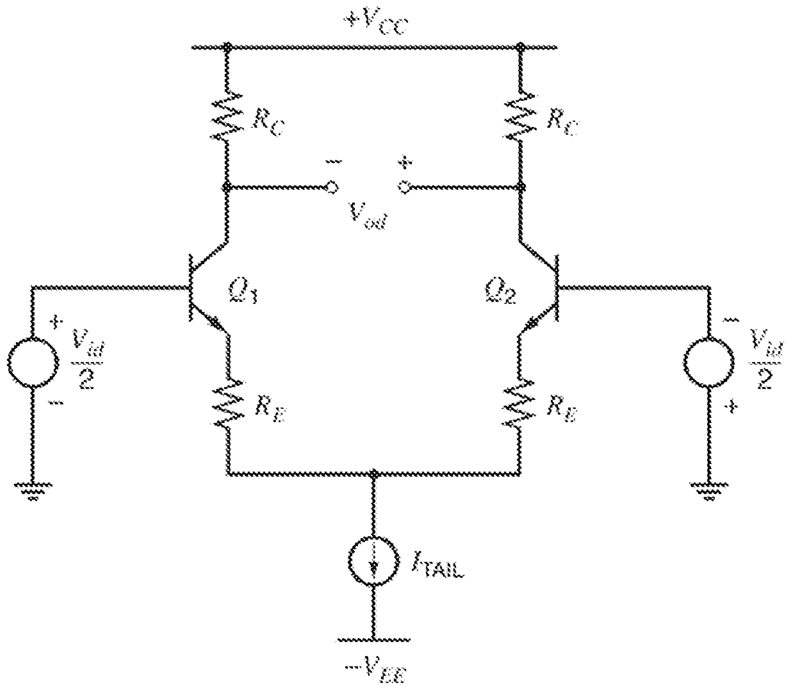
FIG. 15 and FIG. 16 show a voltage amplifier stage of a nonlinear transimpedance amplifier module and a corresponding family of amplification gain curves obtained for different extents of the nonlinearity region, which can be used in embodiments of the invention to control and enhance the amount of nonlinearity added by the transimpedance amplifier module.
Figure 16:
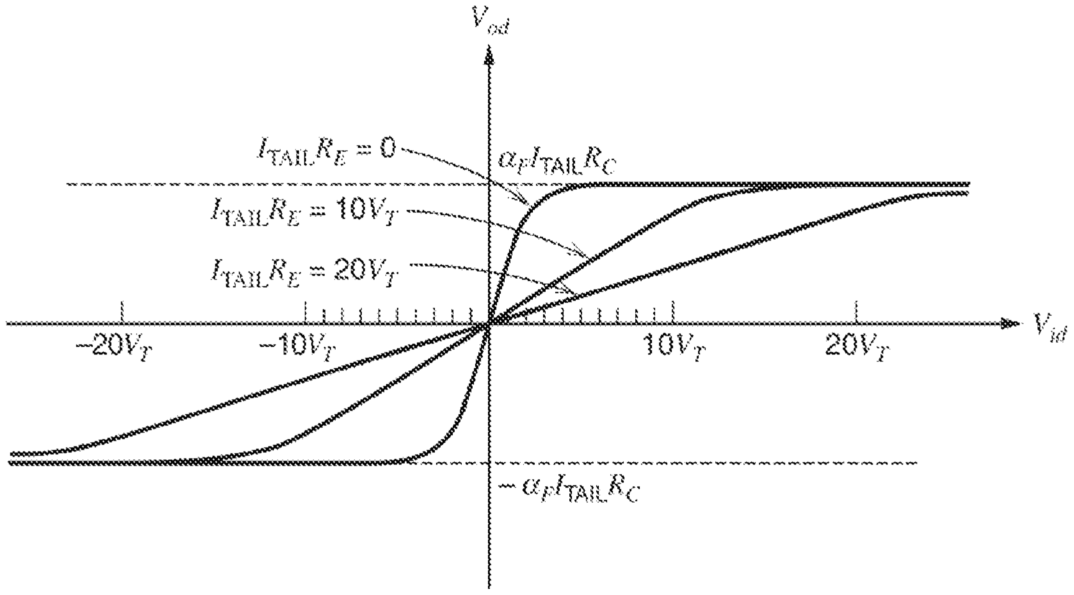

FIG. 15, taken from Gray, Paul R., and Robert G. Meyer "*Analysis and design of analog integrated circuits*" Vol. 4, New York: Wiley, 1984, shows an analogue voltage amplifier stage of a transimpedance amplifier (TIA) module which may be part of the front-end in a photoreceiver module (e.g. comprising at least one photodiode and a TIA connected to the photodiode output). The voltage amplifier stage is configured to provide at its output terminals a differential voltage output signal $V_{od}$, which is an amplified version of a differential voltage input signal $V_{id}$ applicable to the input terminals, e.g. the two transistor bases. The differential voltage input signal $V_{id}$ is representative of the amount of photocurrent generated by the photodiode and can be obtained through a preceding current-to-voltage converter, e.g. a capacitively coupled transimpedance amplifier stage with photodiode DC current compensation and shunt feedback. The differential input has the advantage that efficiently rejects common mode noise. However, an alternative voltage amplifier stage may be single-ended in its inputs and/or outputs. A resistive load $R_C$ is connected between the collector of each transistor Q1 and Q2 and positive voltage supply+Vcc and two identical transistor emitter degeneration resistances $R_E$ are connected between each transistor's emitter terminal and a common bias current source. The other side of the bias current source, which delivers a bias current $I_{Tail}$, is connected to negative voltage supply $-V_{EE}$. FIG. 16 (ibidem) illustrates how the voltage amplifier stage can be operated predominantly in a nonlinear regime. This means that the nonlinearity of the entire TIA module can be controlled and increased, e.g. by shrinking the region in which the voltage amplifier stage has a linear behaviour (output signal proportional to input signal) and at the same time extending the nonlinearity region (output signal compressed and no longer proportional to input signal). The additional nonlinearity of the TIA can be beneficial for boosting the classification performance of the optical signal processing device if the provided modulated input signal, DMS, consists of a sequence of symbols belonging to different classes. This is because the nonlinearity amplifies small differences in the outputs of signal processing units that relate to similarly looking input signals of different symbols (e.g. due to intersymbol interference). The family of amplification gain curves (input-output signal relation) in FIG. 16 corresponds to different choices for the emitter degeneration resistance. By tuning the emitter degeneration resistance value, the linear region of the amplification curve can be extended to many times (e.g. ten times, twenty times, or more) the transistor threshold voltage $V_T$. Such an extended region of linear amplification is usually striven for in photoreceiver modules, in addition to high amplification gain and low input referred noise. In embodiments of the invention, however, it is preferable to operate the voltage amplifier stage and TIA module with an extended nonlinearity range. For instance, the voltage amplifier stage can be configured to have very limited emitter degeneration or be substantially free of emitter degeneration, i.e. $R_E=0$, such that the amplification of the input signal can be approximated by a hyperbolic tangent function. This can be easily realized in existing TIA module designs, by decreasing or removing the emitter degeneration resistance. Alternatively, a controllable emitter degeneration resistance, e.g. voltage-controlled resistance, can be implemented (e.g. using transistors configured to act as resistors). Preferably, the emitter degeneration resistance value is decreased at least to a level for which the voltage drop across the emitter degeneration resistance is less than typical input signal swing, e.g. the voltage drop is less than 10 $V_T$ for input signal swings of ±10 $V_T$. The nonlinearity region of the voltage amplifier stage, extending from the 3 dB compression point onwards, preferably is at least 250% the extent of the linear region (from zero input signal up to the 3 dB compression point), e.g. between 250% and 500% the size of the linear region, or more, with respect to typical input voltage ranges, e.g. ±5-10 $V_T$. In the figure, $\alpha_F$ corresponds to the polar transistor parameter of each of the two identical transistors Q1, Q2. The resulting increase in the nonlinearity of the TIA module can be characterized by the 3 dB gain compression point or by the amount of total harmonic distortion (THD) with respect to an optical input signal.

The present invention also relates to an optical signal processing method that is based on optical transient computing. The method comprises supplying an optical RF-modulated carrier signal of optical bandwidth BW (e.g. 3 dB bandwidth) to a photonic integrated chip (PIC). The PIC comprises at least two optical signal processing units, wherein each signal processing unit includes an optical filter device and a delay element for coherently feeding filter outputs of the filter device back to an input of the filter device. The delay element of each signal processing unit is also configured to receive a portion of the optical RF-modulated carrier signal and coherently combine it with a delayed version of the filter outputs. The delay element may be arranged as a linear or a ring resonator. The group delay of each delay element is comprised in the range from about 0.2/BW to about 0.8/BW and the 3 dB bandwidth of the filter band (e.g. passband) of each filter device is less than the input signal bandwidth BW.

The method comprises selecting a different centre frequency for each filter band such that a frequency offset between adjacent filter bands is between 1 GHZ and 100 GHz, or frequency-tuning the centre frequencies of all filter bands such that a frequency offset between adjacent filter bands is between 1 GHz and 100 GHz. Preferably, the frequency interval between the lowest cut-off frequency and the highest cut-off frequency (3 dB point) among all filter bands spans the input signal bandwidth BW, e.g. corresponds to 80% to 120% of the input signal bandwidth BW. The optical path length of at least one delay element of the PIC may be brought into spectral overlap with the filter band of the filter device to which the delay element is connected.

The method further comprises either a) forming weighted combinations of output signals generated by the plurality of optical signal processing units in response to the received RF-modulated carrier signal and then detecting the formed combinations, or b) detecting the output signals generated by the plurality of optical signal processing units in response to the received RF-modulated carrier signal and then forming weighted combinations of the detected output signals. Here, weighted combinations include linear combinations or functionals (e.g. dot-product) as well as nonlinear transformations of such linear combinations or functionals (e.g. square-modulus transformation, sigmoid-type or ReLU-type transformations in ANN, etc.).

The method may comprise digitizing at least one formed combination and/or comparing at least one of the formed combinations to one or more threshold values. A further step of the method may comprise decoding an encoded symbol that has been received by the optical signal processing devices at the receiver end of a telecommunication channel, wherein transmitted symbols are encoded with forward error correction codes.

The optical RF-modulated carrier signal may be a digitally modulated signal pertaining to a fiber-based data link in an optical communication system, including for example OOK, PSK and higher-order or lower-order QAM. The optical RF-modulated carrier signal may also be representative of a time series for which the next k steps in the future, k≥1, need to be predicted, or may be associated with, or equal to, an optical output of a sensor. Optical streams of sensor data outputs can be processed according to the present method to obtain predictions of future sensor data samples. These predictions in turn can be used in predictive model controllers or control methods, which optimizes sensor operation and/or regulated systems that use the sensor data as feedback.

Simulation Experiment

In the following a simulation of an optical signal processing device in accordance with embodiments of the invention is described for the particular application of correcting errors and correctly classifying symbols that have been transmitted over a fibre communication channel (high-speed serial and unidirectional data link). The symbols are transmitted at a rate of 56 Gbaud over a 60 km long single-mode fibre channel before being received by an optical pre-amplifier (5 dB noise figure) with an amplification gain of at least 12 dB, e.g. about 15 dB in the C-band and at least 20 dB in the O-band. The pre-amplified signal at an average optical power level of 0 dBm is then coupled into the PIC of the optical signal processing device. Fibre-to-chip coupling losses of 3 dB are assumed, but can be less in practical implementations, e.g. about 1 dB or less. A PAM-4 (NRZ) modulation format has been used to transmit the sequence of symbols to be detected and classified by the optical signal processing device. However, other digital modulation formats such as PAM-8 or 16-QAM are possible choices as well. The laser line of a DFB laser with sub-MHZ linewidth (e.g. about 200 kHz emission linewidth) is elected as the optical carrier and externally modulated, e.g. by an electro-optic Mach-Zehnder modulator or electro-absorption modulator. Preferably, the modulation bandwidth of the external modulator is larger than the symbol rate of the transmitted optical signal, but can also be less, e.g. between 70% and 100% of the symbol rate. The optical power of the modulated optical signal that is launched into the 60 km long standard single-mode fibre (optical transmission losses around 0.2 dB/km) is assumed to be 0 dBm for the above-mentioned case of a pre-amplifier being inserted between the fibre end and the PIC. Transmitter-sided signal amplification, e.g. at launched power levels of about 11 dBm for 60 km of standard single-mode fibre, can be used for the case that no optical pre-amplification is carried out in front of the PIC. For these higher launched power levels, the fibre nonlinearities are still relatively weak. Propagation of the transmitted signal along the fibre channel has been simulated via the nonlinear Schrödinger equation and takes nonlinearities in the fibre into account.

The simulation is directed to a PIC as shown in FIG. 1, except that only two optical processing units were included, each receiving 50% of the input signal power. Each filter device of the PIC is modelled as a first-order bandpass filter with centre frequency $f_c$ and 3 dB single-sided optical bandwidth $SSB_0$, for which the transfer function $H_{fil}$ reads:

$$H_{fil}(f) = \frac{1}{1 + j\frac{f - f_C}{SSB_0}}.$$

The single-sided optical bandwidth $SSB_0$ has been varied between 28 GHz and 56 GHz and the centre frequency offset between the two filter bands swept between 2 GHz and 28 GHZ (centred symmetrically about the carrier frequency). The delay loop of each optical signal processing unit has a phase delay of 7 ps at the carrier frequency, whereas the filter devices have a phase delay between approximately 17 ps and 35 ps in the filter passband, depending on the selected value of $SSB_0$. For simulation purposes, the delay loop is assumed to have neglectable group delay dispersion for the investigated symbol rates of interest and the phase delay at the carrier frequency has been assumed to be equal to the group delay (i.e. no delay loop waveguide dispersion). The output signals of the optical signal processing units are detected by two photodiodes, each with a responsivity of 1.0 A/W at the carrier frequency and an electrical bandwidth equal to one half of the symbol rate of the optical input signal. The detected output signals are sampled at the symbol rate prior to quantization. Two ADCs with an effective 8 bit resolution perform the conversion of the sampled signals to digital signals. Next, the two sampled, 8 bit wide signals are supplied to digitally implemented FIRs, each with 51 taps and one symbol time of unit tap delay, and the weighted signals are added subsequently. The FIR is akin to a feedforward equalizer (FFE), commonly found in high-end receivers, but is not subject to any constraints with regard to the tap weights. In variants of the present embodiment, the FIR can be replaced by a FFE, a decision feedback equalizer (DFE), a combination of FFE and DFE, or by higher-order nonlinear versions of the FFE and/or DFE (e.g. Volterra-type nonlinear FFE and/or DFE).

The digital filter output is used by a decision unit, e.g. a slicer, which compares the filter outputs to a set of threshold values, e.g. one less than the number of levels used in the modulation scheme (e.g. three threshold value for PAM-4). The readout signal is provided by the decision unit and corresponds to a sequence of predicted symbols, e.g. with a prediction delay equal to 26 symbol times or half of the FIR maximum delay, based on which the bit error rate (BER) is determined. It is common practice to use a predetermined leading sequence of symbols (overhead), with length equal to the prediction delay, e.g. 25 symbols in the present example, at the start of each new training or testing sequence, whereby the loss of transmitted and received data symbols is prevented. The BER is twice the count of wrongly predicted symbols in the readout signal when compared with the known sequence of transmitted symbols. The FIR weights have been obtained through linear regression on a training data set of $2*10^4$ transmitted symbols. Test results are reported for a test data set containing $5*10^6$ symbols.

Regarding the results of the 2D parameter sweep (filter band offset and $SSB_0$), an optimal bit error rate (BER) of $9.3*10^{-5}$ has been found at a filter band centre frequency offset of 6 GHZ and an $SSB_0$ of 35 GHZ (partially overlapping filter passbands), but good performance is also obtainable at increased filter band offset and filter band bandwidth values. Narrower filter bandwidths, however, have the additional advantage of reducing broadband optical noise, thereby improving the optical signal-to-noise ratio (OSNR). The training parameters of the readout circuit, e.g. the FIR weights, are retrained for each new configuration (filter band offset and $SSB_0$) of the PIC. FIG. 17 shows the results of additional parameter sweeps for the feedback strength, in subplot a), and the phase delay of the delay loops, in subplot b), respectively. It can be seen that a wide range of feedback strengths is supported, e.g. between 20% and 80%, with minimum BER around 50%, which is a good compromise between received power on the photodetector (requiring larger outcoupling ratios) and resonant enhancement (requiring lower cavity losses). Likewise, low BER is obtained over a range of phase delays, e.g. from 10% to about 70% of the symbol time, with an optimal phase delay equal to approximately 50% of the symbol time.

Forward error correction, e.g. Reed-Solomon RS (n,k) code (e.g. n=255, k=233) or LDPC code, can been used in combination with the multilevel modulation format (e.g. coded modulation scheme) to further lower the BER toward practical values, e.g. less than 10-12, e.g. between 10-12 and 10-15. The maximum allowable BER for hard-decision forward error coding to be applicable to the optical signal processing device (HD-FEC limit) is indicated in FIG. 18. This figure also shows, in subplot a), that fibre channels as long as 80 km can be used in combination with the optical signal processing device to achieve substantially error-free transmission PAM-4 code-modulated symbols at 56 Gbd. At 112 Gbd, the maximum transmission distance over fibre is still 70 km. For reference, the receiver performance for a third-order nonlinear Volterra equalizer (201 taps) has been indicated, which only supports fibre lengths up to 60 km for the same photodiode characteristics of the readout circuit and the same optical power on the photodiodes. It is noted that conventional receiver-sided FFE-DFE for PAM-4 coded transmission signals has been demonstrated to be operational up to 10 km of optical fibre and symbol rates of 28 Gbd. The dependence of a PAM-8 symbol rate on the maximum transmission length that can be tolerated for code-modulated symbol transmission is illustrated in subplot b), which uses the same optimized parameters for the PIC as the PAM-4 format. Up to 70 km fibre length has been demonstrated for the PAM-8 modulation format at 37 Gbd and 6 dBm of fibre-launched optical power, whereas increased baud rates of 56 Gbd and 74 Gbd perform well over 40 km and 20 km fibre length respectively.

Embodiments of the invention have the advantage that they can obtain low BER with only a limited number of FIR filter taps, e.g. less than 128 taps, e.g. less than 64 taps, e.g. less than 32 taps, e.g. about 3-16 taps. Since digitally implemented feedforward equalizers (DSP-FFE) with many taps come with significant requirements on power consumption and chip real estate, it is advantageous to keep the number of taps low.

Figure 19:
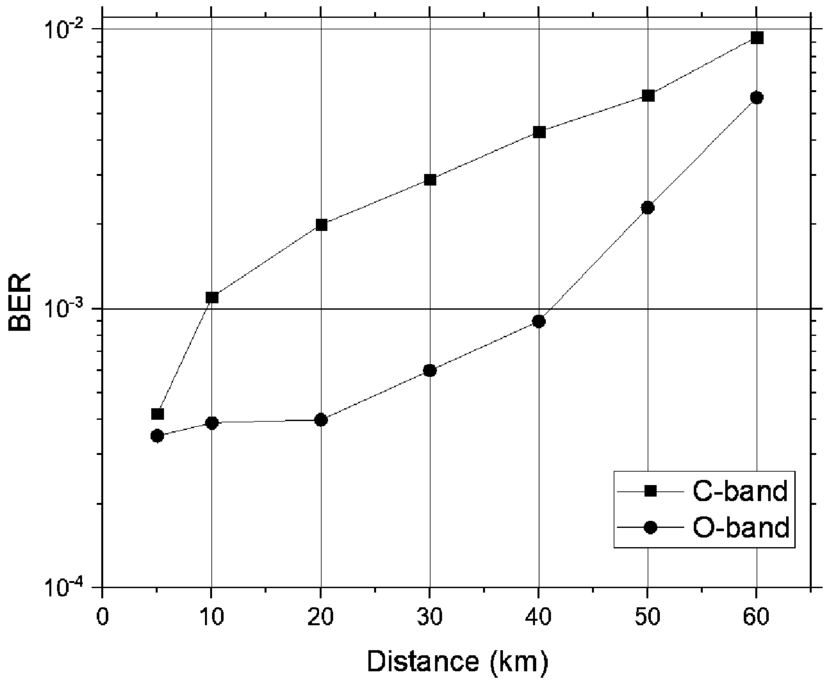
FIG. 19 shows simulated bit error rates obtained for digitally modulated QAM-16 input signals and various transmission distances, using an optical signal processing device with self-coherent homodyne detection in accordance with embodiments of the invention.

Very good results have also been demonstrated for QAM-16 at 56 Gbd and fibre link distances between 5 km and 60 km. The obtained BER curves for optical carriers in the C-band and in the O-band are shown in FIG. 19. The optical signal processing device used for QAM-16 modulated carrier input signals comprises four optical signal processing units for which the filter passbands (e.g. first-order Bessel) centre frequencies are positioned symmetrically at +/−11.2 GHZ and +/−22.4 GHZ with respect to a carrier frequency in the C-band. Since the dispersion in the C-band is uniform, the signal processing device is easily adjusted or redesigned in respect of any particular frequency in the C-band as the carrier frequency and achieves similar performance. A readout circuit as described with reference to FIG. 14 has been used, in which each of the two optical delay filter units has a total of 17 taps and a unit time delay per tap of the optical delay line corresponds to one symbol time. A coherent detection scheme has been applied in which an external local oscillator signal has been synchronized with the optical carrier and applied to each one of the two photodetectors for mixing with the optical superimposition signals. Carrier recovery has been performed by a post-detection technique. For instance, maximum amplitude symbols can be used as pilots for the carrier phase drift relative to the ideal point, after having achieved linear regression with an ideal signal without phase noise. Another robust post-detection technique is the Viterbi phase recovery algorithm. During the symbol classification process, i.e. assigning the detected symbol to a location in the QAM-16 constellation diagram, the decision unit interprets the two photodetector signals as the in-phase and the quadrature component. The complex readout circuit weights have been trained accordingly. A BER of $3*10^{-3}$ at 40 km transmission distance has been achieved for C-band optical carriers with linewidths below 70 kHz. The corresponding BER of $9*10^{-4}$ for O-band carriers is even lower. No carrier synchronization of the local oscillator LO is needed if the QAM-16 modulated carrier input signal has a sufficiently strong DC component. In such a case, the carrier can be recovered directly upon detection, provided carrier linewidths are less than 50 kHz. In such self-coherent direct detection schemes, the relatively strong remaining optical carrier, e.g. a ratio of 10 dB is often assumed in Kramers-Kroning receivers for the power of the optical carrier relative to the power contained in the modulation sidebands, is beating with the modulated part of the input signal (e.g. the part contained in the sidebands). The complex-valued, modulated part of the transmitted signal can be reconstructed from the Kramers-Kroning relation, as used in Kramer-Kroning receivers for instance, in which a strong carrier is placed at the edge of the band-limited, information-carrying signal spectrum.

Figure 20:
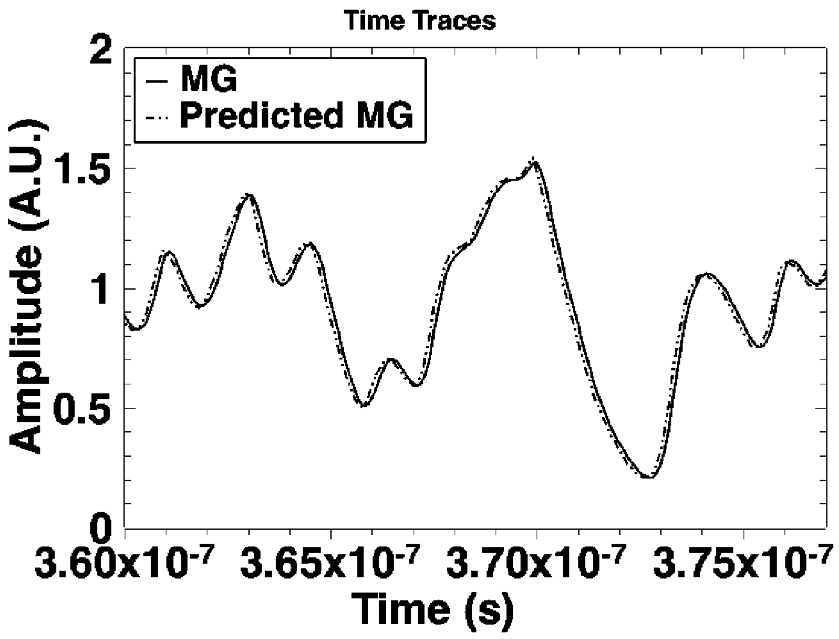
FIG. 20 shows predicted and computed time traces for the Mackey glass system, wherein the predicted time trace is obtained by an optical signal processing devices in accordance with embodiments of the invention.

Although the use of the optical signal processing device for reducing the amount of detected bit errors in a fibre-optical communication channel with multilevel modulation formats has been described extensively, it is stressed that the optical signal processing device can perform other tasks as well. For instance, fast time series prediction is feasible due to the inherently larger bandwidth capacity of the optical processing units in the photonic integrated circuit. FIG. 20 demonstrates excellent one-timestep-ahead prediction results for the nonlinear Mackey-Glass time series prediction tasks. The time predicted time trace by the optical signal processing device closely follows the precomputed time trace for the nonlinear dynamical system described by the Mackey-Glass delay differential equation. The signal processing device that has been simulated to obtain FIG. 20 comprises a PCI with two or more optical signal processing units and a readout circuit in which the photodetector outputs in respect of each signal processing unit is digitized (A/D conversion) and the digital signals are combined and trained with a linear regression stage. As little as two optical signal processing units in the PIC achieve 85% accuracy for the nonlinear Mackey-Glass time series prediction task. Increasing the number of optical signal processing units further, more than 90% accuracy can be obtained.

Furthermore, the signal processing device can be applied to pattern recognition tasks, including the classification of wideband spectroscopic information for which the recorded spectrum is obtained from ultrashort optical pulses (e.g. absorption spectra obtained with femtosecond pulses) and subsequently mapped to the time domain, e.g. using dispersive Fourier mapping in a highly dispersive fibre. The time-varying Fourier signals are then received by the photonic integrated circuit of the signal processing device and transient computing is performed thereon. The optical preprocessing of the time-varying Fourier signals by the photonic integrated circuit facilitates the correct classification of spectral traces (e.g. molecular fingerprints in the infrared), using machine learning techniques known in the art (e.g. linear classifiers, ANNs, reservoir computing based techniques, etc.). Not only one-dimensional spectral records can be classified by dispersive Fourier mapping, but also two-dimensional images as demonstrated in Charis Mesaritakis, Adonis Bogris, Alexandros Kapsalis, and Dimitris Syvridis, "*High-speed all-optical pattern recognition of dispersive Fourier images through a photonic reservoir computing subsystem,*" *Opt. Lett.* 40, 3416-3419 (2015).

In a different pattern recognition task, the classification may be performed for time traces that originated from a time-stretched microscopy system, e.g. a single pixel time-encoded microscopy system (STEM) using a diffraction grating for converting spatial information into wavelength information. The individual time traces correspond to imaged objects that have different spatial features, e.g. different spatial periodicity, different line angles, different edge directivity or gradient, different geometrical shape such as linear, circular, elliptical, angular/corner, etc. Classification rates in the MHz-range can be achieved, possibly even reaching Gframe/see processing with respect to microscopy images.

In yet a different pattern recognition task, image data may be classified. For instance, images of handwritten digits are classified according to the digit 0-9 shown. In a numerical analysis, hardware-based acceleration of an ANN by a photonic integrated circuit (e.g. implemented in a silicon platform) including two, five and ten optical signal processing units (processing nodes) has been studied for the digit classification task, using the MNIST dataset. Each processing unit contains a micro-ring resonator (MRR) based bandpass filter that is subjected to delayed external feedback from a delay line with variable optical attenuation and tuneable phase biasing means, e.g. a processing unit as shown in FIG. 9, except that no optical gain element is provided. The time delay by the delay element is chosen as 20 ps, optical attenuation losses are assumed 1.0 $m^{-1}$, the phase bias is set to $\pi$ over the whole filter passband range (3 dB single-sided optical bandwidth equal to 12 GHz and 6 GHz for the cases of two and five processing units respectively), and power coupling coefficients were assumed 0.5. The centre frequencies of optical bandpass filters were offset by 5.5 GHZ and 17.5 GHz relative to the carrier frequency of the amplitude-modulated optical signal input to the photonic integrated circuit in the case of two processing units, and by 2.5 GHZ, 7.5 GHZ, 12.5 GHZ, 17.5 GHZ, and 22.5 GHz in the case of five processing units. A drop-out port of the MRR is used as a readout port, which is connected to a photodetector and subsequent ADC for output signal digitization, e.g. similar to the arrangement shown in FIG. 11, but with a lower number of optical signal processing units. The ANN is digitally implemented (but optical implementations are also feasible) and comprises an input layer, whose nodes receive the digital output signals from the respective ADCs, and an output layer fully connected to the input layer.

The output layer of the digital ANN contains ten nodes, corresponding to each one of the ten digit classes 0-9, which are softmax-activated.

Under operating conditions, the raw images of the MNIST image dataset (60 k images used for training, 10 k images used for validation and testing) are block-wise serialized into a single input vector. For instance, using pixel blocks of size 3×3, a first block of 9 pixels is serialized, then a second block of 9 pixels is serialized, etc., until all the pixel blocks of the image have been serialized and a single input vector is obtained (e.g. of size 1*729). The input vector is used as a baseband signal for amplitude modulation of an optical carrier wave, thus generating an optical input signal to the photonic integrated circuit. Amplitude modulation is performed at a symbol rate of 50 Gbaud/s, wherein the value of each pixel is interpreted as a symbol. An average power of the optical input signal can be as low as 1 mW without any significant loss in classification accuracy. The optical input signal is spectrally decomposed by the set of optical processing units, which are also referred to as recurrent optical slicing network. For a circuit comprising five processing units, a digit classification accuracy of 97.2% has been obtained on the MNIST dataset, which makes it competitive to state-of-the-art convolutional neural networks such as LeNet and VGG. In comparison thereto, a single-layer ANN having 729 input and 10 output neurons (7290 trainable connections) achieved 92% of classification accuracy.

Figure 21:
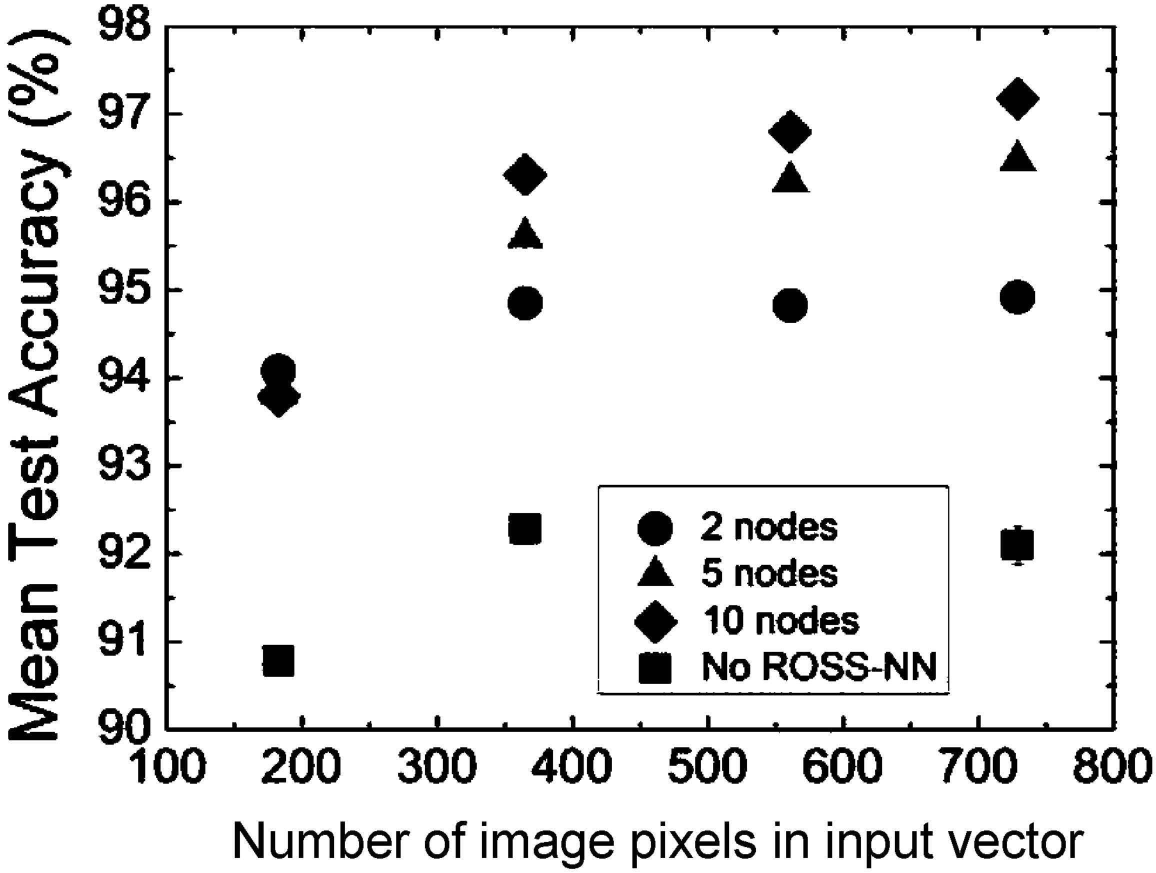
FIG. 21 shows the dependence of test results for the MNIST digit classification task, achieved by a single-layer ANN, and a single-layer ANN in combination with a photonic integrated circuit according to embodiments of the invention, as a function of the number of sampled image pixels.

The photodetector bandwidth can be advantageously limited to 5 GHz to perform an averaging operation on each pixel block. Moreover, the sampling rate can be decreased to values below the Nyquist rate of 10 GS/s without a significant loss in performance, e.g. decreased by a factor of four. This has the additional advantage that less trainable connections are required in the ANN part, resulting in a less complex and more energy-efficient ANN. Alternatively, the ANN can be operated at a higher throughput (e.g. in terms of classifications per minute). FIG. 21 is a graph that plots the simulated mean accuracy for the MNIST digit classification dataset (average on 50 runs of the training dataset) as a function of image pixels that are sampled into each input vector, for the cases of a single-layer ANN without optical pre-processing and for a combination of single-layer ANN with a photonic circuit of different node sizes as optical pre-processor.

Eventually, embodiments of the invention may provide or generate a time-multiplexed optical carrier as the digitally RF-modulated optical carrier signal, e.g. the time-multiplexed signal levels may be obtained by carrier modulation with a set of temporally interleaved digital signals, where each digital signal may itself be multi-valued. The time-multiplexing of the input signal to be processed has the advantage that it allows a temporal unfolding of each optical signal processing unit, thereby increasing the number of virtually available signal processing units on the PIC.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments. Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. Any reference signs in the claims should not be construed as limiting the scope.

The invention claimed is:

1. A photonic integrated circuit for performing optical transient computing on an RF-modulated optical carrier signal, the photonic integrated circuit comprising at least two parallelly operable optical signal processing units, each optical signal processing unit including an optical filter device and an optical delay element, connected to an input port and an output port of the filter device and arranged externally to the filter device, for providing an externally delayed feedback signal to the filter device, an input section of the delay element being configured to coherently combine the modulated carrier signal with said externally delayed feedback signal to create a new filter input signal, wherein the group delay induced by the delay element is comprised in the range from 1 ps to 100 ps and the 3 dB optical bandwidth of a filter band of the filter device is less than the inverse of the group delay, and the delay element further being adapted to spectrally align at least a portion of the filter band with a resonance in the feedback signal, and wherein center frequencies of filter bands associated with different optical signal processing units are offset, or tunable to have an offset, between 1 GHz and 100 GHz relative to each other, thus allowing different portions of the modulated carrier signal spectrum to be filtered.

2. The photonic integrated circuit according to claim 1, wherein the filter device and the delay element of each processing unit form a linear cavity, the input port and the output port of the filter device being a single bidirectional port of the filter device and the filter device being configured to operate in reflection mode.

3. The photonic integrated circuit according to claim 1, wherein the filter device and the delay element of each processing unit form a ring cavity, the input port and the output port of the filter device being different unidirectional ports of the filter device and the filter device being configured to operate in transmission mode.

4. The photonic integrated circuit according to claim 1, wherein filter bands associated with different ones of the plurality of optical signal processing units are partially overlapping in frequency space, and/or wherein the 3 dB optical bandwidth of each filter band is comprised in the range from 5 GHz to 150 GHz.

5. The photonic integrated circuit according to claim 1, wherein the filter bands associated with the plurality of optical signal processing units are contiguous in frequency space, and/or wherein points of cross-over between neighboring filter bands are regularly distributed in frequency space.

6. The photonic integrated circuit according to claim 1, wherein each filter device is a bandpass filter or a peaking comb filter.

7. The photonic integrated circuit according to claim 1, wherein each filter device is a bandstop filter or a notching comb filter.

8. The photonic integrated circuit according to claim 1, wherein the delay element of at least one of the plurality of optical signal processing units comprises at least one of the following: a further optical filter device, a variable optical attenuator, an optical gain element, a phase modulator.

9. A method for reducing intersymbol interference in data streams sent over a fiber communication channel, the method comprising:

applying a digitally RF-modulated optical carrier signal to the photonic integrated circuit according to claim 1, wherein a symbol duration of the modulated optical carrier signal is larger than a roundtrip time for the externally delayed feedback signal through the delay element and filter device of the at least two optical signal processing units;

providing a set of pretrained weights and weighting output signal of the plurality of optical signal processing units, or signals derived therefrom, with the pretrained weights in the optical or the electrical domain;

combining the weighted signals into at least one readout signal.

10. The method of claim 9, further comprising:

providing a local oscillator signal of substantially equal frequency as the optical carrier signal, and frequency-mixing the local oscillator signal with output signal of the plurality of optical signal processing units, or signals derived therefrom, on at least one photodetector.

11. A signal processing device comprising:

a photonic integrated circuit for performing optical transient computing on an RF-modulated optical carrier signal, the photonic integrated circuit comprising at least two parallelly operable optical signal processing units, and a trainable readout circuit configured for weighting output signals from the plurality of signal processing units, or signals derived therefrom, and for combining the weighted signals into at least one readout signal, wherein each optical signal processing unit includes an optical filter device and an optical delay element, connected to an input port and an output port of the filter device and arranged externally to the filter device, for providing an externally delayed feedback signal to the filter device, an input section of the delay element being configured to coherently combine the modulated carrier signal with said externally delayed feedback signal to create a new filter input signal, wherein the group delay induced by the delay element is comprised in the range from 1 ps to 100 ps and the 3 dB optical bandwidth of a filter band of the filter device is less than the inverse of the group delay, and the delay element further being adapted to spectrally align at least a portion of the filter band with a resonance in the feedback signal, and wherein center frequencies of filter bands associated with different optical signal processing units are offset, or tunable to have an offset, between 1 GHz and 100 GHz relative to each other, thus allowing different portions of the modulated carrier signal spectrum to be filtered.

12. The signal processing device according to claim 11, the readout circuit further comprising a plurality of photodetectors, operatively coupled to respective outputs of the plurality of optical signal processing units, and at least one electronic filter configured for weighting and summing a plurality of photodetector output signals.

13. The signal processing device according to claim 12, wherein the at least one electronic filter is a digital or analog finite impulse response filter of filter order $M \geq 0$ and having a set of adjustable filter weights.

14. The signal processing device according to claim 12, wherein the at least one electronic filter is a digitally implemented artificial neural network having a set of adjustable layer interconnection weights.

15. The signal processing device according to claim 12, wherein the photodetectors are provided as part of the photonic integrated circuit.

16. The signal processing device according to claim 12, wherein a transimpedance amplifier module connected to each photodetector comprises at least one voltage amplifier stage configured to operate in the nonlinearity region.

17. The signal processing device according to claim 11, the readout circuit further comprising at least one linear optical readout stage, operatively coupled to respective outputs of the plurality of optical signal processing units and configured for weighting and summing a plurality of output signals from the plurality of optical signal processing units, and at least one photodetector for detecting the summed and weighted output signals from the linear optical readout stage.

18. The signal processing device according to claim 17, wherein the at least one linear optical readout stage is a tapped or branched optical delay line filter of filter order $M \geq 0$ and having a set of adjustable filter weights.

19. The signal processing device according to claim 11, the readout circuit further comprising a control unit for controlling a set of adjustable weights applicable to the output signals from the plurality of signal processing units, or the signals derived therefrom, the control unit being configured to generate error signals from the at least one readout signal and a target sequence, and to update the set of weights based on the error signals, wherein the at least one readout signal is obtained with respect to a training signal being the RF-modulated optical carrier signal, modulated with a training sequence associated with the target sequence.

20. The signal processing device according to claim 11, further comprising a decision circuit for determining a symbol value of a digitally modulated optical carrier signal based on the at least one readout signal, by comparing the readout signal to one or more threshold levels.

* * * * *